United States Patent
Edlund

(10) Patent No.: US 9,605,224 B2
(45) Date of Patent: Mar. 28, 2017

(54) REFINING ASSEMBLIES AND REFINING METHODS FOR RICH NATURAL GAS

(71) Applicant: Element 1 Corp., Bend, OR (US)

(72) Inventor: David J Edlund, Bend, OR (US)

(73) Assignee: Element 1 Corp., Bend, OR (US)

( * ) Notice: Subject to any disclaimer, the term of this patent is extended or adjusted under 35 U.S.C. 154(b) by 50 days.

(21) Appl. No.: 14/734,763

(22) Filed: Jun. 9, 2015

(65) Prior Publication Data

US 2016/0131424 A1 May 12, 2016

Related U.S. Application Data

(60) Provisional application No. 62/078,505, filed on Nov. 12, 2014, provisional application No. 62/128,682, filed on Mar. 5, 2015.

(51) Int. Cl.
*C10L 3/08* (2006.01)
*C10L 3/10* (2006.01)
*B01J 8/02* (2006.01)

(52) U.S. Cl.
CPC ............. *C10L 3/08* (2013.01); *B01J 8/0285* (2013.01); *C10L 3/10* (2013.01); *C10L 3/106* (2013.01);
(Continued)

(58) Field of Classification Search
CPC ......... B01J 8/067; B01J 8/0285; B01J 8/009; C10L 3/08; C10L 3/104; C10L 3/106; C10L 3/10
See application file for complete search history.

(56) References Cited

U.S. PATENT DOCUMENTS 2,151,329 A    3/1939   Page et al.
3,415,634 A    12/1968   Dent et al.
(Continued)

FOREIGN PATENT DOCUMENTS

DE    69120740    11/1996
DE    69219084    7/1997
(Continued)

OTHER PUBLICATIONS

David Edlund, "Methanol Fuel Cell Systems: Advancing Towards Commercialization", 2011, 199 pages, Pan Stanford Publishing Pte. Ltd., Singapore.
(Continued)

*Primary Examiner* — Lessanework Seifu
(74) *Attorney, Agent, or Firm* — Kolisch Hartwell, P.C.

(57) ABSTRACT

Refining assemblies and methods for refining rich natural gas containing a first methane gas and other hydrocarbons that are heavier than methane gas are disclosed. In some embodiments, the assemblies may include a methane-producing assembly configured to receive at least one liquid-containing feed stream that includes water and rich natural gas and to produce an output stream therefrom by (a) converting at least a substantial portion of the other hydrocarbons of the rich natural gas with the water to a second methane gas, a lesser portion of the water, and other gases, and (b) allowing at least a substantial portion of the first methane gas from the rich natural gas to pass through the methane-producing assembly unconverted. The assemblies may additionally include a purification assembly configured to receive the output stream and to produce a methane-rich stream therefrom having a greater methane concentration than the output stream.

27 Claims, 22 Drawing Sheets

(52) U.S. Cl.
CPC ..... *C10L 2290/06* (2013.01); *C10L 2290/541* (2013.01); *C10L 2290/545* (2013.01); *C10L 2290/548* (2013.01)

(56) References Cited

U.S. PATENT DOCUMENTS

| | | | |
|---|---|---|---|
| 3,421,871 A | 1/1969 | Davies et al. | |
| 3,586,621 A | 6/1971 | Pitchford et al. | |
| 3,642,460 A | 2/1972 | Thompson | |
| 3,737,291 A | 6/1973 | Lhonore et al. | |
| 3,825,490 A * | 7/1974 | Vachuda | B01D 53/02 208/31 OR |
| 3,838,994 A | 10/1974 | Aldridge | |
| 3,888,043 A | 6/1975 | Child et al. | |
| 4,104,201 A | 8/1978 | Banks et al. | |
| 5,139,541 A | 8/1992 | Edlund | |
| 5,217,506 A | 6/1993 | Edlund et al. | |
| 5,259,870 A | 11/1993 | Edlund | |
| 5,266,283 A | 11/1993 | Friesen et al. | |
| 5,281,254 A | 1/1994 | Birbara et al. | |
| 5,393,325 A | 2/1995 | Edlund | |
| 5,498,278 A | 3/1996 | Edlund | |
| 5,645,626 A | 7/1997 | Edlund et al. | |
| 5,861,137 A | 1/1999 | Edlund | |
| 5,997,594 A | 12/1999 | Edlund et al. | |
| 6,136,222 A | 10/2000 | Friesen et al. | |
| 6,152,995 A | 11/2000 | Edlund | |
| 6,221,117 B1 | 4/2001 | Edlund et al. | |
| 6,319,306 B1 | 11/2001 | Edlund et al. | |
| 6,368,742 B2 | 4/2002 | Fisher et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,402,818 B1 | 6/2002 | Sengupta | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,465,118 B1 | 10/2002 | Dickman et al. | |
| 6,494,937 B1 | 12/2002 | Edlund et al. | |
| 6,495,277 B1 | 12/2002 | Edlund et al. | |
| 6,537,352 B2 | 3/2003 | Edlund et al. | |
| 6,547,858 B1 | 4/2003 | Edlund et al. | |
| 6,562,111 B2 | 5/2003 | Edlund et al. | |
| 6,564,579 B1 | 5/2003 | McCartney | |
| 6,569,227 B2 | 5/2003 | Edlund et al. | |
| 6,596,057 B2 | 7/2003 | Edlund et al. | |
| 6,616,841 B2 | 9/2003 | Cho et al. | |
| 6,632,270 B2 | 10/2003 | Edlund et al. | |
| 6,667,128 B2 | 12/2003 | Edlund | |
| 6,719,831 B2 | 4/2004 | Edlund et al. | |
| 6,719,832 B2 | 4/2004 | Edlund et al. | |
| 6,723,156 B2 | 4/2004 | Edlund et al. | |
| 6,767,389 B2 | 7/2004 | Edlund et al. | |
| 6,783,741 B2 | 8/2004 | Edlund et al. | |
| 6,811,908 B2 | 11/2004 | Edlund et al. | |
| 6,818,335 B2 | 11/2004 | Edlund et al. | |
| 6,824,593 B2 | 11/2004 | Edlund et al. | |
| 6,835,481 B2 | 12/2004 | Dickman et al. | |
| 6,858,341 B2 | 2/2005 | Edlund | |
| 6,869,707 B2 | 3/2005 | Edlund et al. | |
| 6,878,474 B2 | 4/2005 | Dickman et al. | |
| 6,890,672 B2 | 5/2005 | Dickman et al. | |
| 6,953,497 B2 | 10/2005 | Edlund et al. | |
| 6,979,507 B2 | 12/2005 | Edlund et al. | |
| 6,994,927 B2 | 2/2006 | Edlund et al. | |
| 7,005,113 B2 | 2/2006 | Edlund et al. | |
| 7,008,708 B2 | 3/2006 | Edlund et al. | |
| 7,052,530 B2 | 5/2006 | Edlund et al. | |
| 7,101,421 B2 | 9/2006 | Edlund et al. | |
| 7,135,048 B1 | 11/2006 | Edlund et al. | |
| 7,147,677 B2 | 12/2006 | Edlund | |
| 7,195,663 B2 | 3/2007 | Edlund et al. | |
| 7,201,783 B2 | 4/2007 | Edlund | |
| 7,208,241 B2 | 4/2007 | Edlund et al. | |
| 7,250,231 B2 | 7/2007 | Edlund | |
| 7,258,946 B2 | 8/2007 | Edlund | |
| 7,297,183 B2 | 11/2007 | Edlund et al. | |
| 7,368,194 B2 | 5/2008 | Dickman et al. | |
| 7,368,195 B2 | 5/2008 | Edlund et al. | |
| 7,390,587 B2 | 6/2008 | Dickman et al. | |
| 7,410,531 B2 | 8/2008 | Edlund et al. | |
| 7,470,293 B2 | 12/2008 | Edlund et al. | |
| 7,476,455 B2 | 1/2009 | Edlund | |
| 7,485,381 B2 | 2/2009 | Dickman et al. | |
| 7,601,302 B2 | 10/2009 | Edlund et al. | |
| 7,632,321 B2 | 12/2009 | Edlund | |
| 7,632,322 B2 | 12/2009 | Edlund | |
| 7,641,795 B2 | 1/2010 | Taylor et al. | |
| 7,659,019 B2 | 2/2010 | Edlund | |
| 7,682,718 B2 | 3/2010 | Dickman et al. | |
| 7,736,596 B2 | 6/2010 | Edlund et al. | |
| 7,771,882 B2 | 8/2010 | Edlund et al. | |
| 7,789,941 B2 | 9/2010 | Edlund et al. | |
| 7,819,955 B2 | 10/2010 | Edlund et al. | |
| 7,828,864 B2 | 11/2010 | Edlund et al. | |
| 7,846,569 B2 | 12/2010 | Edlund et al. | |
| 7,939,211 B2 | 5/2011 | Edlund et al. | |
| 7,977,000 B2 | 7/2011 | Edlund | |
| 7,981,172 B2 | 7/2011 | Edlund et al. | |
| 7,985,510 B2 | 7/2011 | Edlund et al. | |
| 8,021,446 B2 | 9/2011 | Adams et al. | |
| 8,038,748 B2 | 10/2011 | Edlund | |
| 8,057,575 B2 | 11/2011 | Edlund et al. | |
| 8,133,626 B2 | 3/2012 | Edlund et al. | |
| 8,956,428 B2 | 2/2015 | Carnell et al. | |
| 8,961,627 B2 | 2/2015 | Edlund | |
| 2001/0045061 A1 | 11/2001 | Edlund et al. | |
| 2002/0041837 A1 | 4/2002 | Edlund et al. | |
| 2002/0071976 A1 | 6/2002 | Edlund | |
| 2002/0114984 A1 | 8/2002 | Edlund et al. | |
| 2003/0167690 A1 | 9/2003 | Edlund et al. | |
| 2003/0192251 A1 | 10/2003 | Edlund et al. | |
| 2003/0223926 A1 | 12/2003 | Edlund et al. | |
| 2003/0223931 A1 | 12/2003 | Narayan | |
| 2004/0081867 A1 | 4/2004 | Edlund | |
| 2004/0081868 A1 | 4/2004 | Edlund | |
| 2004/0099138 A1 | 5/2004 | Karode et al. | |
| 2004/0197616 A1 | 10/2004 | Edlund et al. | |
| 2005/0188616 A1 | 9/2005 | Bizjak et al. | |
| 2006/0037476 A1 | 2/2006 | Edlund et al. | |
| 2006/0081524 A1 | 4/2006 | Sengupta et al. | |
| 2006/0090397 A1 | 5/2006 | Edlund et al. | |
| 2006/0216562 A1 | 9/2006 | Edlund et al. | |
| 2007/0062116 A1 | 3/2007 | Edlund et al. | |
| 2007/0274904 A1 | 11/2007 | Popham et al. | |
| 2008/0115669 A1 | 5/2008 | Edlund et al. | |
| 2008/0138677 A1 | 6/2008 | Edlund | |
| 2008/0176118 A1 | 7/2008 | Edlund et al. | |
| 2008/0187797 A1 | 8/2008 | Edlund | |
| 2008/0222954 A1 | 9/2008 | Adams et al. | |
| 2010/0064887 A1 | 3/2010 | Edlund et al. | |
| 2010/0261074 A1 | 10/2010 | Edlund et al. | |
| 2011/0250518 A1 | 10/2011 | Edlund et al. | |
| 2011/0256459 A1 | 10/2011 | Edlund | |
| 2011/0256491 A1 | 10/2011 | Edlund et al. | |
| 2012/0058403 A1 | 3/2012 | Edlund et al. | |
| 2012/0208903 A1 | 8/2012 | Gafney | |
| 2013/0011301 A1 | 1/2013 | Edlund | |
| 2013/0090505 A1* | 4/2013 | Catchpole | C10L 3/08 585/310 |
| 2014/0065020 A1 | 3/2014 | Edlund et al. | |
| 2014/0065021 A1 | 3/2014 | Edlund | |
| 2015/0122128 A1 | 5/2015 | Edlund | |

FOREIGN PATENT DOCUMENTS

| | | |
|---|---|---|
| DE | 69730071 | 8/2005 |
| DE | 60035418 | 3/2008 |
| EP | 0036268 | 9/1981 |
| EP | 0570185 | 11/1993 |
| EP | 0652042 | 5/1995 |
| EP | 0718031 | 6/1996 |
| EP | 0470822 | 7/1996 |
| EP | 0546808 | 4/1997 |

(56) References Cited

FOREIGN PATENT DOCUMENTS

| | | |
|---|---|---|
| EP | 0783919 | 7/1997 |
| EP | 1010942 | 2/2003 |
| EP | 0800852 | 8/2004 |
| EP | 1272259 | 10/2004 |
| EP | 1516663 | 3/2005 |
| EP | 1135822 | 4/2005 |
| EP | 1523054 | 4/2005 |
| EP | 1679111 | 7/2006 |
| EP | 0951529 | 8/2006 |
| EP | 1252678 | 11/2006 |
| EP | 1189678 | 7/2007 |
| EP | 1290747 | 2/2009 |
| EP | 1138096 | 10/2010 |
| EP | 2359928 | 8/2011 |
| GB | 2432369 | 4/2010 |
| JP | 10052621 | 2/1998 |
| JP | 2003277019 | 10/2003 |
| JP | 2003282119 | 10/2003 |
| JP | 2007099528 | 4/2007 |
| JP | 2008171815 | 7/2008 |
| JP | 2008285404 | 11/2008 |
| TW | 200404739 | 4/2004 |
| TW | 200629635 | 8/2006 |
| TW | 200740014 | 10/2007 |
| WO | 8806489 | 9/1988 |
| WO | 9919456 | 4/1999 |
| WO | 0022690 | 4/2000 |
| WO | 0056425 | 9/2000 |
| WO | 0108247 | 2/2001 |
| WO | 0112311 | 2/2001 |
| WO | 0112539 | 2/2001 |
| WO | 0126174 | 4/2001 |
| WO | 0150541 | 7/2001 |
| WO | 0150542 | 7/2001 |
| WO | 0168514 | 9/2001 |
| WO | 0170376 | 9/2001 |
| WO | 0173879 | 10/2001 |
| WO | 0193362 | 12/2001 |
| WO | 0238265 | 5/2002 |
| WO | 0249128 | 6/2002 |
| WO | 02069428 | 9/2002 |
| WO | 03002244 | 1/2003 |
| WO | 03026776 | 4/2003 |
| WO | 03077331 | 9/2003 |
| WO | 03086964 | 10/2003 |
| WO | 03089128 | 10/2003 |
| WO | 03100900 | 12/2003 |
| WO | 2004038845 | 5/2004 |
| WO | 2004091005 | 10/2004 |
| WO | 2005001955 | 1/2005 |
| WO | 2005091785 | 10/2005 |
| WO | 2005119824 | 12/2005 |
| WO | 2006033773 | 3/2006 |
| WO | 2006049918 | 5/2006 |
| WO | 2006050335 | 5/2006 |
| WO | 2006133003 | 12/2006 |
| WO | 2007035467 | 3/2007 |
| WO | 2007037856 | 4/2007 |
| WO | 2008008279 | 1/2008 |
| WO | 2008033301 | 3/2008 |
| WO | 2009008962 | 7/2009 |
| WO | 2010033628 | 3/2010 |
| WO | 2010118221 | 10/2010 |
| WO | 2011059446 | 5/2011 |
| WO | 2012067612 | 5/2012 |
| WO | 2014099606 | 6/2014 |

OTHER PUBLICATIONS

International Searching Authority of United States Receiving Office, International Search Report, Jan. 28, 2016, 2 pages.
International Searching Authority of United States Receiving Office, Written Opinion, Jan. 28, 2016, 20 pages.
United States Patent and Trademark Office, Office Action for U.S. Appl. No. 14/820,256, Oct. 13, 2016, 35 pages.
United States Patent and Trademark Office, Office Action for U.S. Appl. No. 14/937,629, Feb. 3, 2017, 40 pages.

* cited by examiner

REFINING ASSEMBLIES AND REFINING METHODS FOR RICH NATURAL GAS

CROSS-REFERENCE TO RELATED APPLICATIONS

This application claims the benefit of U.S. Provisional Patent Application Ser. No. 62/078,505, which was filed on Nov. 12, 2014 and entitled "Process and Method of Refining Wet Natural Gas." Additionally, this application claims the benefit of U.S. Provisional Patent Application Ser. No. 62/128,682, which was filed on Mar. 5, 2015 and entitled "Membrane-Assisted Process and Method of Refining Wet Natural Gas." The complete disclosures of the above applications are hereby incorporated by reference for all purposes.

BACKGROUND OF THE DISCLOSURE

Rich natural gas is a mixture of hydrocarbon compounds that includes methane gas and other hydrocarbon compounds (or other hydrocarbons) heavier than methane gas. Rich natural gas may include methane gas in any concentration, such as 50% or higher. The other hydrocarbon compounds may include any compounds with hydrogen atoms and two or more carbon atoms, such as ethane, propane, butane, isobutene, pentane, propylene, and/or other hydrocarbon compounds. Rich natural gas may be found in crude oil wells, gas wells, condensate wells, and/or other sources. In crude oil wells, the rich natural gas may be dissolved in oil at the high pressures existing in a well and/or as a gas cap above the oil.

The rich natural gas may need to be purified to at least substantially remove or separate the other hydrocarbon compounds from the methane gas before the natural gas is used. The purified or product stream may be used in a variety of applications. One such application is for combustion engines, such as the combustion engines used in commercial engine-driven generators (gensets). The separated other hydrocarbon compounds also may be used in a variety of applications, such as inputs for petrochemical plants, space heating and cooking, and for blending into vehicle fuel.

SUMMARY OF THE DISCLOSURE

Some embodiments may provide a refining assembly for rich natural gas containing a first methane gas and other hydrocarbons that are heavier than methane gas. In some embodiments, the refining assembly may include a methane-producing assembly configured to receive at least one liquid-containing feed stream that includes water and rich natural gas and to produce an output stream therefrom by (a) converting at least a substantial portion of the other hydrocarbons of the rich natural gas with the water to a second methane gas, a lesser portion of the water, and other gases, and (b) allowing at least a substantial portion of the first methane gas from the rich natural gas to pass through the methane-producing assembly unconverted. The refining assembly may additionally include a purification assembly configured to receive the output stream and to produce a methane-rich stream therefrom having a greater methane concentration than the output stream.

In some embodiments, the refining assembly may include a vaporizer configured to receive and vaporize at least a portion of at least one liquid-containing feedstream that includes water and rich natural gas to form an at least substantially vaporized stream. The refining assembly may additionally include a methane-producing reactor containing a catalyst and configured to receive the vaporized feed stream and to produce an output stream by (a) converting at least a substantial portion of the other hydrocarbons with the water to a second methane gas, a lesser portion of the water, hydrogen gas, and carbon oxide gas, and (b) allowing at least a substantial portion of the first methane gas from the rich natural gas stream to pass through the methane-producing reactor unconverted. The refining assembly may further include a first heating assembly configured to receive at least one fuel stream and at least one air stream and produce a heated exhaust stream for heating at least one of the vaporizer to at least a minimum vaporization temperature or the methane-producing reactor to at least a minimum methane-producing temperature. The refining assembly may additionally include a purification assembly configured to receive the output stream and to produce a methane-rich stream therefrom having a greater methane concentration than the output stream.

Some embodiments may provide a method of refining rich natural gas containing a first methane gas and other hydrocarbons that are heavier than methane gas. In some embodiments, the method may include converting at least a substantial portion of the other hydrocarbons of the rich natural gas with water to an output stream containing a second methane gas, a lesser portion of the water, hydrogen gas, and carbon oxide gas. Converting at least a substantial portion of the other hydrocarbons may include not converting at least a substantial portion of the first methane gas from the rich natural gas. The method may additionally include removing at least a portion of the water from the output stream to produce an at least substantially dried stream therefrom. The method may further include converting at least a portion of the carbon oxide gas and at least a portion of the hydrogen gas from the at least substantially dried stream to methane gas to form an intermediate stream therefrom containing a lower concentration of hydrogen gas and carbon oxide gas compared to the at least substantially dried stream. The method may additionally include separating, from the intermediate stream, at least a portion of the carbon oxide gas to form a byproduct stream therefrom. The remaining portion of the intermediate stream may form at least part of a methane-rich stream having a greater methane concentration than the intermediate stream.

DETAILED DESCRIPTION OF THE DISCLOSURE

Figure 1:
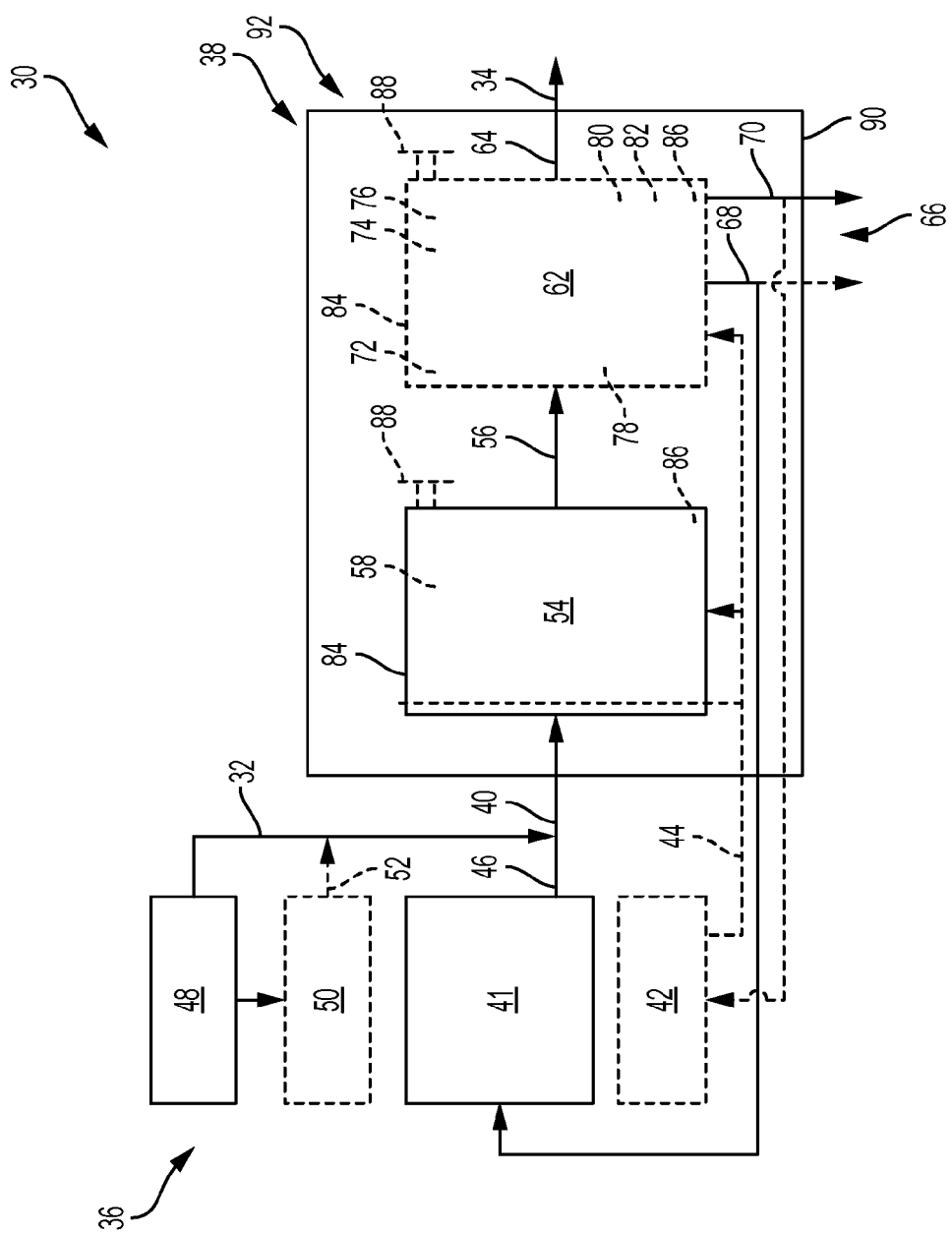
FIG. 1 is a schematic view of an example of a refining assembly for rich natural gas.

FIG. 1 shows an example of a refining assembly 30 for rich natural gas. Unless specifically excluded refining assembly 30 may include one or more components of other refining assemblies and/or other assemblies described in this disclosure. The refining assembly may include any suitable structure configured to receive at least one rich natural gas stream 32 and generate a product methane stream 34. For example, the refining assembly may include a feedstock delivery system 36 and a fuel processing system 38. The feedstock delivery system may include any suitable structure configured to selectively deliver at least one feed stream 40 (which includes rich natural gas stream 32) to the fuel processing assembly.

In some embodiments, feedstock delivery system 36 may additionally include any suitable structure configured to selectively deliver at least one fuel stream 44 from a fuel source 42 (such as storage cylinder(s) or vessel(s)) to one or more burners and/or other heating assemblies of fuel processing system 38. The feedstock delivery system may include any suitable delivery mechanisms, such as pumps, compressors, and/or other mechanism(s) for propelling fluid streams. In some embodiments, feedstock delivery system 36 may be configured to deliver feed stream(s) 40 and/or fuel stream(s) 44 without requiring the use of pumps, compressors, and/or other electrically powered fluid-delivery mechanisms. In some embodiments, feedstock delivery system may include a heat exchanger and/or other heating device(s) configured to pre-heat or heat one more streams, such as feed stream(s) 40, prior to fuel processing system 38.

Feed stream 40 may include a methane-production fluid stream 46 and rich natural gas stream 32. The methane-production fluid stream may include at least one methane-production fluid, such as water from a water source 41. Water source 41 may include a connection to publicly available water (e.g., tap water, running water, municipal water, etc.), a storage vessel, a surface water source (e.g., river, lake, etc.), a groundwater source, and/or other source(s). In some embodiments, water from water source 41 may be deionized prior to delivery as methane-production fluid stream 46. Rich natural gas stream 32 may be from a rich natural gas source 48, such as a well head, a storage vessel, and/or other source(s). When methane-production fluid stream 46 includes liquid water, feed stream 40 may sometimes be referred to as a "liquid-containing feedstream." The ratio of water to rich natural gas delivered by the feedstock delivery system to the fuel processing system may vary according to one or more factors, such as the amount of carbon in the rich natural gas, user preferences, design of the fuel processing system, mechanism(s) used by the fuel processing system to generate the product methane stream, etc. For example, the molar ratio of water to carbon atoms or steam-to-carbon ratio may be 1:1 to 4:1, preferably 1.5:1 to 3:1, and particularly preferred 1.8:1 to 2.5:1. In some embodiments, the feedstock delivery system may control the flow of methane-production fluid stream 46 and/or rich natural gas stream 32 to provide one or more of the above molar ratios to the fuel processing system.

In some embodiments, rich natural gas stream 32 may be treated in a desulfurization assembly 50 to produce a desulfurized rich natural gas stream 52, such as prior to delivery to fuel processing system 38 Desulfurization assembly 50 may include any suitable structure configured to use any suitable mechanism(s) to at least substantially remove sulfur compounds (e.g., organosulfur compounds, hydrogen sulfides, carbonyl sulfides, and/or other sulfur-containing compounds) from the rich natural gas. For example, desulfurization assembly 50 may include a tower containing an amine solution (e.g., monoethanolamine and diethanolamine) that is configured to absorb sulfur compounds.

Although feedstock delivery system 36 is shown to be configured to deliver a single feed stream 40, the feedstock delivery system may be configured to deliver two or more feed streams 40. Those streams may contain the different compositions, at least one common component, no common components, or the same compositions. For example, feedstock delivery system may be configured to deliver methane-production fluid stream 46 and rich natural gas stream 32 separately into the fuel processing system. Additionally, although feedstock delivery system 36 may, in some embodiments, be configured to deliver a single fuel stream 44, the feedstock delivery system may be configured to deliver two or more fuel streams.

The fuel streams may have different compositions, at least one common component, no common components, or the same compositions. Moreover, the rich natural gas, methane-production fluid, and fuel streams may be discharged from the feedstock delivery system in different phases. For example, one or more of the streams may be liquid stream(s) (such as the water and/or fuel streams) while the one or more of the other streams may be gas streams (such as the rich natural gas stream(s)). Furthermore, although refining assembly 30 is shown to include a single feedstock delivery system 36, the refining assembly may include two or more feedstock delivery systems 36.

Fuel processing system 38 may include any suitable structure configured to process feed stream(s) 40, such as to increase concentration of methane gas and/or reduce concentration of other components in the rich natural gas stream. For example, fuel processing system 38 may include a methane-producing assembly 54 configured to produce an output stream 56 containing methane gas via any suitable methane-producing mechanism(s). The output stream may include methane gas as at least a majority component and may include additional gaseous component(s). Output stream 56 may therefore be referred to as a "mixed gas stream" that contains methane gas as its majority component but which includes water and other gases.

Methane-producing assembly 54 may include any suitable catalyst-containing bed or region. When the methane-producing mechanism is heavy hydrocarbon reforming, the methane-producing assembly may include a suitable heavy hydrocarbon reforming catalyst 58 to facilitate production of output stream(s) 56 from feed stream(s) 40. In such an embodiment, methane-producing assembly 54 may convert at least a substantial portion of other hydrocarbons that are heavier than methane gas with water to methane gas, a lesser portion of the water, and other gases.

Additionally, methane-producing assembly 54 may allow at least a substantial portion of methane gas from rich natural gas stream(s) 32 to pass through the methane-producing assembly unchanged, unreacted, and/or unconverted. In other words, methane gas in output stream 56 may include (1) methane gas in the rich natural gas stream(s) prior to methane-producing assembly 54 and fuel processing system 38, and (2) methane gas that was produced in methane-producing assembly 54 from the conversion of other hydrocarbons in the rich natural gas stream(s) with water. When heavy hydrocarbon reforming is the methane-producing mechanism in methane-producing assembly 54, methane-producing assembly 54 may sometimes be referred to as a "heavy hydrocarbon reformer," and output stream 56 may sometimes be referred to as a "reformate stream." The other gases that may be present in the reformate stream may include carbon oxide gas and/or hydrogen gas. As used herein, "carbon oxide gas" refers to carbon dioxide gas and/or carbon monoxide gas.

In some embodiments, fuel processing system 38 may include a purification (or separation) assembly 62, which may include any suitable structure configured to produce at least one methane-rich stream 64 from output (or mixed gas) stream 56. Methane-rich stream 64 may include a greater methane concentration than output stream 56 and/or a reduced concentration of water and one or more other gases (or impurities) that were present in that output stream. Product methane stream 34 includes at least a portion of methane-rich stream 64. Thus, product methane stream 34 and methane-rich stream 64 may be the same stream and have the same composition and flow rates. Alternatively, some of the purified methane gas in methane-rich stream 64 may be stored for later use, such as in a suitable methane storage assembly and/or consumed by the fuel processing system. Purification assembly 62 also may be referred to as a "methane purification device" or a "methane processing assembly."

In some embodiments, purification assembly 62 may produce one or more streams 66 other than methane-rich stream 64. For example, purification assembly 62 may produce at least one reclaimed water stream 68, which may be at least substantially liquid water. The reclaimed water stream may be discharged to drain, stored for later use, deionized, sent to feedstock delivery system 36 (such as to supplement water source 41), and/or otherwise utilized, stored, and/or disposed. Additionally, purification assembly 62 may produce the reclaimed water stream as a continuous stream responsive to the delivery of output stream 56, or may produce that stream intermittently, such as in a batch process or when the water portion of the output stream is retained at least temporarily in the purification assembly.

Additionally, purification assembly 62 may produce at least one byproduct stream 70, which may contain no methane gas or some methane gas. The byproduct stream may be exhausted, sent to a burner assembly and/or other combustion source, sent to feedstock delivery system 36 (such as to supplement fuel source 42), stored for later use, and/or otherwise utilized, stored, and/or disposed. Additionally, purification assembly 62 may produce the byproduct stream as a continuous stream responsive to the delivery of output stream 56, or may produce that stream intermittently, such as in a batch process or when the byproduct portion of the output stream is retained at least temporarily in the purification region.

Fuel processing system 38 may include one or more purification assemblies 62 configured to produce one or more reclaimed water streams and/or one or more byproduct streams. The byproduct streams 70 may contain sufficient amounts of methane gas and/or other flammable/combustible gases to be suitable for use as a fuel stream, such as for one or more heating assemblies of the fuel processing system. In some embodiments, the byproduct stream may have sufficient fuel value or methane content to enable one or more heating assemblies to maintain the methane-producing assembly at a desired operating temperature or within a selected range of temperatures, and/or to maintain one or more assemblies in purification assemblies 62 at a predetermined operating temperature or within a predetermined range of temperatures.

Purification assembly 62 may include any suitable structure configured to enrich (and/or increase) the concentration of at least one component of output stream 56. In most applications, methane-rich stream 64 will have a greater methane concentration than output stream (or mixed gas stream) 56. The methane-rich stream may alternatively, or additionally, have a reduced concentration of one or more non-methane components that were present in output stream 56 with the methane concentration of the methane-rich stream being more, the same, or less than the output stream.

Examples of suitable devices for purification assembly 62 include gas dryers 72 and/or water knockout devices 74, which may additionally produce reclaimed water stream(s) 68. Other examples of suitable devices for purification assembly include one or more synthetic natural gas (SNG) reactors 76, scrubbers 78, carbon oxide-selective membranes 80, and/or membrane contactors 82, which may additionally produce byproduct stream(s) 70. Purification assembly 62 may include more than one type of purification device and the devices may have the same or different structures and/or operate by the same or different mechanism(s). For example, purification assembly 62 may include multiple gas dryers 72 and/or water knockout devices 74. In some examples, a water knockout device 74 and/or a gas dryer 72 may be upstream one or more of the other devices in purification assembly 62. For example, purification assembly 62 may include a water knockout device 74 and/or a gas dryer 72 upstream each SNG reactor 76, scrubber 78, carbon oxide-selective membrane 80, and/or membrane contactor 82

Gas dryers 72 may include devices that are capable of selectively removing water vapor from a gas stream. Examples of gas dryers 72 include water-selective membranes, desiccant beds, refrigeration dryers, and/or other devices for removing water vapor from gases. An example of a suitable refrigeration dryer is the Drypoint® RA series sold by Beko or the SPL series sold by Parker. Water knockout devices 74 may include devices that separate out liquid water (e.g., entrained liquid water), such as coalescing filters. SNG reactors 76 may convert carbon oxide gas (such as carbon dioxide gas and/or carbon monoxide gas) and hydrogen gas to produce methane gas and water. In some embodiments, SNG reactors 76 may cause hydrogen to react primarily with carbon dioxide gas, and secondarily with carbon monoxide gas.

Scrubbers 78 may receive at least one absorbent that is adapted to absorb carbon oxide gas and/or hydrogen gas. The scrubbers may include an absorber (or absorber portion) configured to direct the flow of the gas stream with carbon oxide and/or hydrogen gas through the at least one absorbent that is adapted to absorb the carbon oxide gas and/or hydrogen gas from that gas stream. The absorbent may be a liquid and/or solid. In some embodiments, scrubbers 78 may include a stripper (or stripper portion) downstream from the absorber portion. The stripper may be configured to strip and/or remove at least a substantial portion of the carbon oxide gas and/or hydrogen gas from the absorbent.

Carbon oxide-selective membranes 80 may be permeable to carbon oxide gas and/or hydrogen gas, but are at least substantially (if not completely) impermeable to methane in output stream 56. Membranes 80 may be formed of any carbon oxide-permeable and/or hydrogen-permeable material suitable for use in the operating environment and parameters in which purification assembly 62 is operated. Examples of suitable materials for membranes 80 include cellulose acetate, polyimide, polysulfone, and poly(amido-amine) doped poly(ethylene glycol).

Membrane contactors 82 may include devices that include carbon oxide-selective membranes to separate carbon oxide gas and/or hydrogen gas, and a liquid absorbent adapted to absorb carbon oxide gas and/or hydrogen gas. For example, a permeate side of the carbon oxide-selective membranes may receive liquid absorbent. Carbon oxide gas and/or hydrogen gas may pass from a feed side to the permeate side, and then may be absorbed by the liquid absorbent. The membranes may provide a stable interface to allow gas-liquid contacting over a large total surface area without foaming, large gas contacting columns, etc.

Methane-producing assembly 54 and/or purification assembly 62 may each be contained within an assembly housing or assembly shell 84. In some embodiments, purification assembly 62 may include separate assembly housings or assembly shells 84 for each component or set of components. For example, when purification assembly 62 includes one or more SNG reactors 76, those reactors may be contained within an assembly housing or an assembly shell 84 separate from other components or assemblies of purification assembly 62. Those other components also may be contained in separate assembly housings or assembly shells 84. Assembly shell 84 may include insulating material 86, such as a solid insulating material, blanket insulating material, and/or an air-filled cavity. The insulating material may be internal the shell, external the shell, or both. When the insulating material is external a shell, fuel processing system 38 may further include an outer cover or jacket 88 external the insulation, as schematically illustrated in FIG. 1.

Fuel processing system 38 may additionally include a frame 90 that supports methane-producing assembly 54 and/or purification assembly 62. In some embodiments, the methane-producing assembly and/or the purification assembly may additionally be contained within a system housing or system shell 92. Frame 90 and/or system shell 92 may enable components of fuel processing system to be moved as a unit. The shell also may protect components of the fuel processing system from damage by providing a protective enclosure. In some embodiments, system shell 92 may include insulating material and/or an outer cover or jacket. The fuel processing system may include a different system frame and/or system shell that includes additional components of the refining assembly, such as feedstock delivery system 36 and/or other components.

One or more components of fuel processing system 38 may either extend beyond the frame and/or system shell or be located external the frame and/or system shell. For example, one or more components and/or assemblies of purification assembly 62 may be located external the frame and/or system shell, such as being spaced-away from the shell but in fluid communication by suitable fluid-transfer conduits. As another example, a portion of methane-producing assembly 54 may extend beyond the shell, such as indicated schematically with a dashed line representing an alternative shell configuration in FIG. 1.

Figure 2:
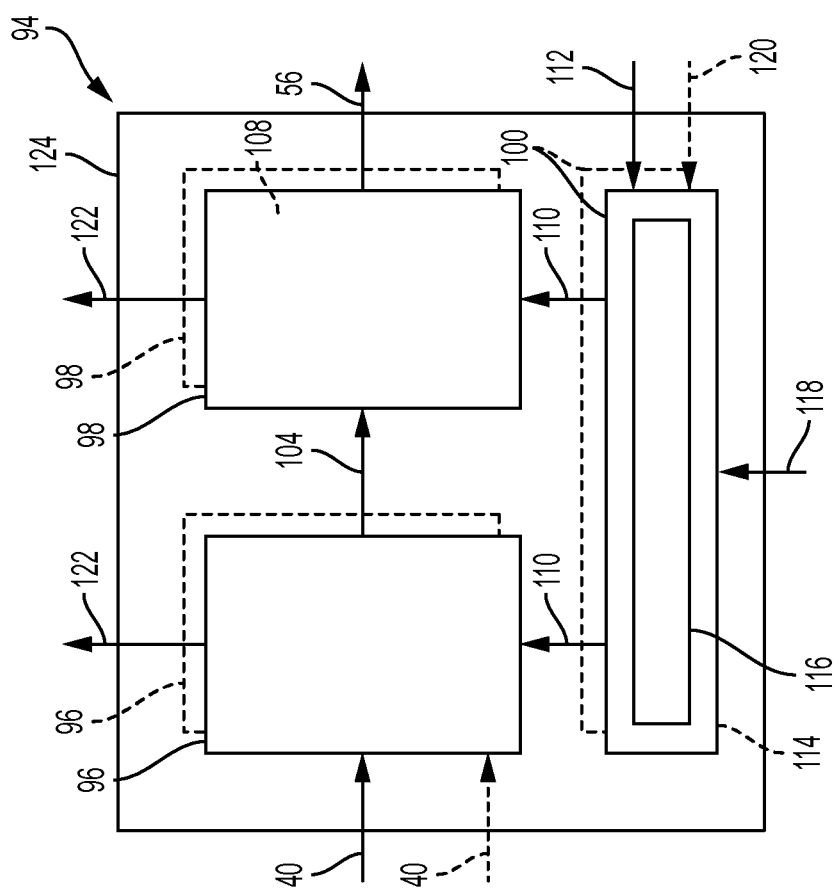
FIG. 2 is a schematic view of an example of a methane-producing assembly of the refining assembly of FIG. 1.

An example of a methane-producing assembly 54 is shown in FIG. 2, which is generally indicated at 94. Unless specifically excluded, methane-producing assembly 94 may include one or more components of other methane-producing assemblies and/or other assemblies described in this disclosure. Methane-producing assembly 94 may include at least one vaporizing region or vaporizer 96, at least one methane-producing region or reactor 98, and at least one heating assembly 100.

Vaporizer 96 may include any suitable structure configured to receive and vaporize at least a portion of a liquid-containing feedstream, such as feed stream(s) 40 that include water and rich natural gas, into one or more vapor feed streams 104 (such as one or more at least substantially vaporized streams). Feed stream(s) 40 may have a pressure of <500 psig, and preferably between 20 psig and 100 psig or between 40 psig and 200 psig. In vaporizer 96, at least a substantial portion of liquid water in feed stream(s) 40 may be vaporized into water vapor, which may mix with the rich natural gas in the feed stream(s). The vaporized feed streams may, in some embodiments, include liquid(s). An example of a suitable vaporizer is a coiled tube vaporizer, such as a coiled stainless steel tube.

Methane-producing reactor 98 may include any suitable structure configured to receive one or more feed streams, such as vapor feed streams 104 from vaporizer 96, to produce one or more output streams 56 containing methane as a majority component, water, and other gases. The methane-producing reactor may produce the output stream via any suitable mechanism(s). For example, methane-producing reactor 98 may generate output stream 56 via a heavy hydrocarbon reforming (HHR) reaction. When methane-producing reactor 98 generates output stream 56 via a HHR reaction, that reactor may sometimes be referred to as a "heavy hydrocarbon reforming reactor" or a "HHR reactor."

Methane-producing reactor 98 may have any suitable design, such as a tubular or cylindrical design. Additionally, methane-producing reactor 98 may include any suitable catalyst-containing bed or region to accelerate chemical reaction or conversion rates. When the methane-producing mechanism is HHR, the methane-producing reactor may include a suitable HHR catalyst 108 to facilitate production of output stream(s) 56 from vapor feed stream(s) 104. Examples of suitable HHR catalysts include nickel-based catalysts (such as Reformax® 100-RS and HyProGen® R-70, both sold by Clariant®, Louisville, Ky.; and MC-750R sold by Unicat, Houston, Tex.) and ruthenium-based catalysts (such as M-10 sold by Clariant®, Louisville, Ky.).

Methane-producing reactor 98 may be configured to convert at least a substantial portion of hydrocarbon compounds heavier than methane gas in the vapor feed stream with the water in that stream to methane gas, a lesser portion of the water, and other gases. Additionally, methane-producing reactor 98 may be configured to allow at least a substantial portion of the methane gas in vapor feed stream 104 to pass through the methane-producing reactor unconverted, unchanged, and/or unreacted. As an example, methane-producing reactor 98 may be configured to convert propane in the vapor feed stream with the water in that stream to methane gas, carbon oxides, hydrogen, and water as shown in the approximate chemical reaction below.

$$C_3H_8 + 6H_2O \rightarrow 2.1CH_4 + 0.7CO_2 + 0.2CO + 1.4H_2 + 4.4H_2O$$

The above equation is only an example and does not represent all the conversions and/or reactions that may occur in the methane-producing reactor, such as when vapor feed stream 104 includes hydrocarbon compounds heavier than methane gas other than propane.

Methane-producing assembly 94 also may include a temperature modulating assembly in the form of heating assembly 100. The heating assembly may be configured to produce at least one heated exhaust stream (or combustion stream) 110 from at least one heating fuel stream 112, typically as combusted in the presence of air. Heated exhaust stream 110 is schematically illustrated in FIG. 2 as heating vaporizer 96 and methane-producing reactor 98. Heating assembly 100 may include any suitable structure configured to generate the heated exhaust stream(s), such as a burner or combustion catalyst in which a fuel is combusted with air to produce the heated exhaust stream. The heating assembly may include an ignitor or ignition source 114 that is configured to initiate the combustion of fuel. Examples of suitable ignition sources include one or more spark plugs, glow plugs, combustion catalyst, pilot lights, piezoelectric ignitors, spark igniters, hot surface igniters, etc.

Heating assembly 100 may achieve and/or maintain in vaporizer 96 and/or methane-producing reactor 98 any suitable temperatures. For example, heating assembly 100 may heat vaporizer 96 to at least a minimum vaporization temperature, and/or may heat methane-producing reactor 98 to at least a minimum methane-producing temperature. HHR reactors may operate at temperatures in the range of 200° C. to 600° C., preferably 250° C. to 500° C., and more preferably 390° C. to 470° C. The above temperature ranges are much lower than the temperature ranges for steam reforming methane, which typically is about 800° C. to 900° C.

In some embodiments, heating assembly 100 may include a burner assembly 116 and may be referred to as a combustion-based, or combustion-driven, heating assembly. In a combustion-based heating assembly, heating assembly 100 may be configured to receive at least one fuel stream 112 and to combust the fuel stream in the presence of air to provide a hot combustion stream 110 that may be used to heat the vaporizer and/or methane-producing reactor. Air may be delivered to the heating assembly via a variety of mechanisms. For example, an air stream 118 may be delivered to the heating assembly as a separate stream, as shown in FIG. 2. Alternatively, or additionally, air stream 118 may be delivered to the heating assembly with at least one of the fuel streams 112 for heating assembly 100 and/or drawn from the environment within which the heating assembly is utilized.

Fuel stream 112 may include any combustible liquid(s) and/or gas(es) that are suitable for being consumed by heating assembly 100 to provide the desired heat output. In some embodiments, one or more fuel stream(s) 112 may be delivered to the heating assembly via feedstock delivery system 36. Some fuel streams may be gases when delivered and combusted by heating assembly 100, while others may be delivered to the heating assembly as a liquid stream. Examples of suitable heating fuels for fuel streams 112 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen gas and/or carbon oxide gas. For example, one or more byproduct streams 120 from other components and/or assemblies of the fuel processing system may be used as a suitable heating fuel for fuel stream(s) 112.

Combustion stream 110 may additionally, or alternatively, be used to heat other portions of the fuel processing system and/or other systems with which the heating assembly is used. After combustion stream 110 heats vaporizer 96, methane-producing reactor 98, and/or other components and assemblies, the stream may exit as combustion exhaust stream(s) 122.

Additionally, other configuration and types of heating assemblies 100 may be used. For example, heating assembly 100 may be an electrically powered heating assembly that is configured to heat vaporizer 96 and/or methane-producing reactor 98 by generating heat using at least one heating element (such as a resistive heating element), waste heat stream(s), solar heating, etc. In those embodiments, heating assembly 100 may not receive and combust a combustible fuel stream to heat vaporizer to a suitable vaporization temperature and/or heat methane-producing reactor to a suitable methane-producing temperature. Examples of heating assemblies are disclosed in U.S. Pat. No. 7,632,322, the complete disclosure of which is hereby incorporated by reference for all purposes.

The heating assembly also may be configured to heat other components and/or assemblies, such as a feedstock delivery system, the feedstock supply streams, purification assemblies, or any suitable combination of those systems, streams, and regions. The heating assembly may additionally be configured to heat other components of the refining assembly. For example, the heated exhaust stream may be configured to heat a pressure vessel and/or other canister containing the heating fuel and/or the hydrogen-production fluid that forms at least portions of feed stream(s) 40 and fuel stream(s) 112.

Heating assembly 100 may be housed in an assembly shell or housing 124 with the vaporizer and/or methane-producing reactor. The heating assembly may be separately positioned relative to the vaporizer and/or methane-producing reactor but in thermal and/or fluid communication with those components to provide the desired heating. Heating assembly 100 may be located partially or completely within the common shell, and/or at least a portion (or all) of the heating assembly may be located external that shell. When the heating assembly is located external the shell, the hot combustion gases from burner assembly 116 may be delivered via suitable heat transfer conduits to one or more components within the shell.

Although methane-producing assembly 94 is shown to include a single vaporizer 96, a single methane-producing reactor 98, and a single heating assembly 100, the methane-producing assembly may include two or more vaporizers 96, two or more methane-producing reactors 98, and/or two or more heating assemblies 100, as shown in dashed lines in FIG. 2.

Figure 4:
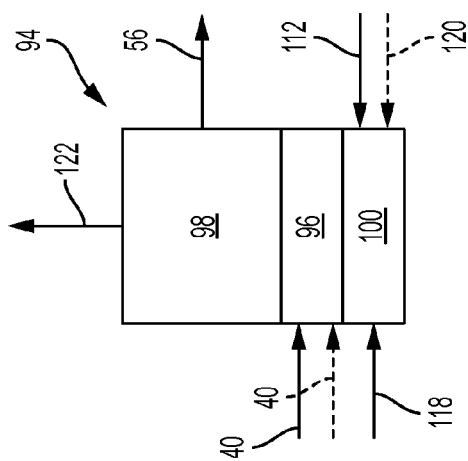
Figure 5:
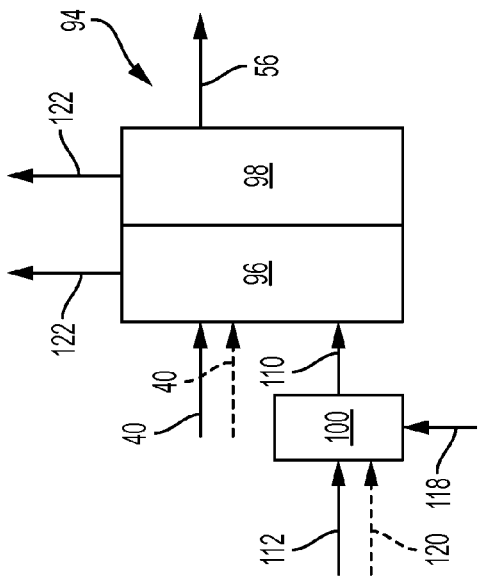

Vaporizer 96, methane-producing reactor 98, and heating assembly 100 may be arranged in any suitable configuration. Examples of suitable configurations are shown in FIGS. 3-5.

Figure 3:
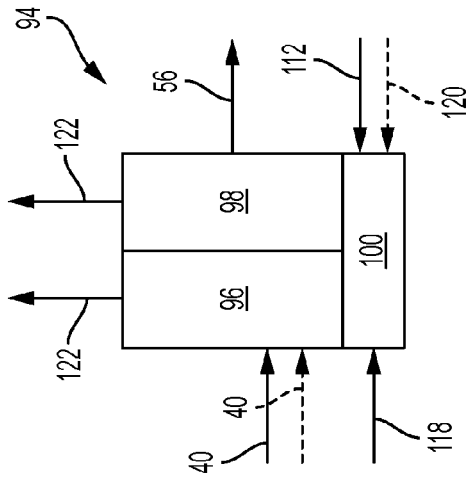
FIGS. 3-5 are schematic views of different configurations for the methane-producing assembly of FIG. 2.

In FIG. 3, vaporizer 96 is disposed between methane-producing reactor 98 and heating assembly 100. In FIG. 4, vaporizer 96 and methane-producing reactor 98 are side-by-side with heating assembly 100 below the vaporizer and methane-producing reactor. In FIG. 5, vaporizer 96 and methane-producing reactor 98 are side-by-side with heating assembly 100 spaced from and adjacent to vaporizer 96.

Figure 6:
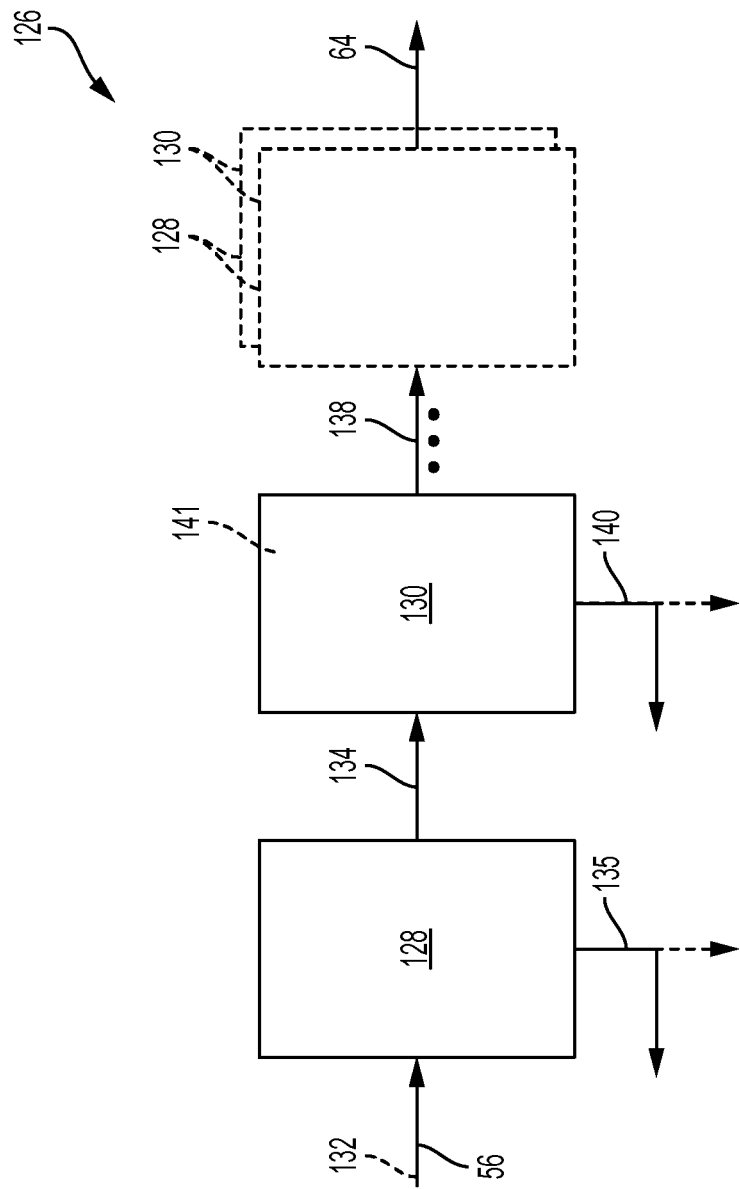
FIG. 6 is a schematic view of an example of a purification assembly of the refining assembly of FIG. 1.

An example of a purification assembly 62 is shown in FIG. 6, which is generally indicated at 126. Unless specifically excluded, purification assembly 126 may include one or more components of other purification assemblies described in this disclosure. Purification assembly 126 may include at least one water removal assembly 128 and at least one gas removal assembly 130.

Water removal assembly 128 may include any suitable structure configured to remove water from output stream 56 of methane-producing assembly 54 (or an intermediate stream 132) to produce an at least substantially dried stream 134 (such as an at least substantially dried output stream). The water removed by the water removal assembly may be in the form of water vapor and/or liquid water. Water removal assembly 128 may produce one or more reclaimed water streams 135 from the water removed from output stream 56 and/or intermediate stream 132. The reclaimed water may be pumped or otherwise transported to a feedstock delivery system for use in the methane-producing assembly and/or may be stored, sent to drain, or otherwise disposed.

Gas removal assembly 130 may include any suitable structure configured to remove one or more other gases (such as gases other than methane gas) from at least substantially dried stream 134 to form methane-rich stream 64. For example, gas removal assembly 130 may be configured to remove carbon oxide gas and/or hydrogen gas from at least substantially dried stream 134. When purification assembly 126 includes two or more gas removal assemblies 130, one or more upstream gas removal assemblies may remove one or more other gases from at least substantially dried stream 134 to form one or more intermediate streams 138. Gas removal assembly(ies) 130 may produce one or more byproduct streams 140 from the removed gases, such as carbon oxide gas and hydrogen gas. The byproduct streams may be pumped or otherwise transported to feedstock delivery system 36 and/or one or more heating assemblies to burn as fuel, and/or may be stored, discharged, or otherwise disposed.

In some embodiments, gas removal assembly 130 may include a carbon oxide-selective membrane assembly having one or more carbon oxide-selective membranes 141. The carbon oxide-selective membranes may include any suitable structure configured to remove carbon oxide gas and/or hydrogen gas from at least substantially dried stream(s) 134 and/or intermediate stream(s) 138. Carbon oxide-selective membranes 141 may have a relatively high permeability to carbon oxide gas and/or hydrogen gas over methane gas such that dried output stream 134 and/or intermediate stream 138, when passed through one or more of the carbon oxide-selective membranes, would be preferentially depleted of at least a portion of carbon oxide gas and/or hydrogen gas. The carbon oxide gas and/or hydrogen gas may form byproduct stream(s) 140. Examples of suitable carbon oxide-selective membranes include cellulose acetate (from UOP), polyimide and polysulfone (from Air Products and Membrane Technology and Research, Inc.), and poly(amidoamine) doped poly(ethylene glycol) (from Kyushu University, Japan).

When gas removal assembly 130 includes one or more carbon oxide-selective membranes 141, at least substantially dried stream 134 and/or intermediate stream 138 may be at a pressure greater than 40 psig, and preferably greater than 80 psig. Gas removal assembly 130 may include one or more pumps or compressors to provide streams 134 and/or 138 at the pressures described above to the carbon oxide-selective membranes. Methane-rich stream(s) 64 and/or intermediate stream(s) 138 exiting the carbon oxide-selective membranes may contain less than 5% of carbon dioxide, and preferably less than 3% of carbon dioxide.

Purification assembly 126 may include any suitable number of water removal assemblies 128 and/or any suitable number of gas removal assemblies 130, as shown in the dashed boxes in FIG. 6. When the purification assembly includes two or more water removal assemblies 128, those assemblies may be the same or different from each other. Additionally, when the purification assembly includes two or more gas removal assemblies 130, those assemblies may be the same or different from each other. For example, one or more gas assemblies 130 may be configured to remove one or more other gases via a first mechanism, while one or more other gas assemblies 130 may be configured to remove one or more other gases via a second mechanism that is different from the first mechanism.

Moreover, when there are two or more gas assemblies, those assemblies may remove different types of other gases and/or remove those gases in different proportions. Furthermore, the water removal assemblies and gas assemblies may be in any suitable sequence or order. In some embodiments, purification assembly 126 may include a water removal assembly 128 upstream of one or more gas removal assemblies 130. For example, purification assembly 126 may include a water removal assembly, a first gas removal assembly, and a second gas removal assembly. In some embodiments, purification assembly 126 may include a water removal assembly 128 upstream each gas removal assembly 130. For example, purification assembly 126 may include a first water removal assembly, a first gas removal assembly, a second water removal assembly, and a second gas removal assembly.

Figure 7:
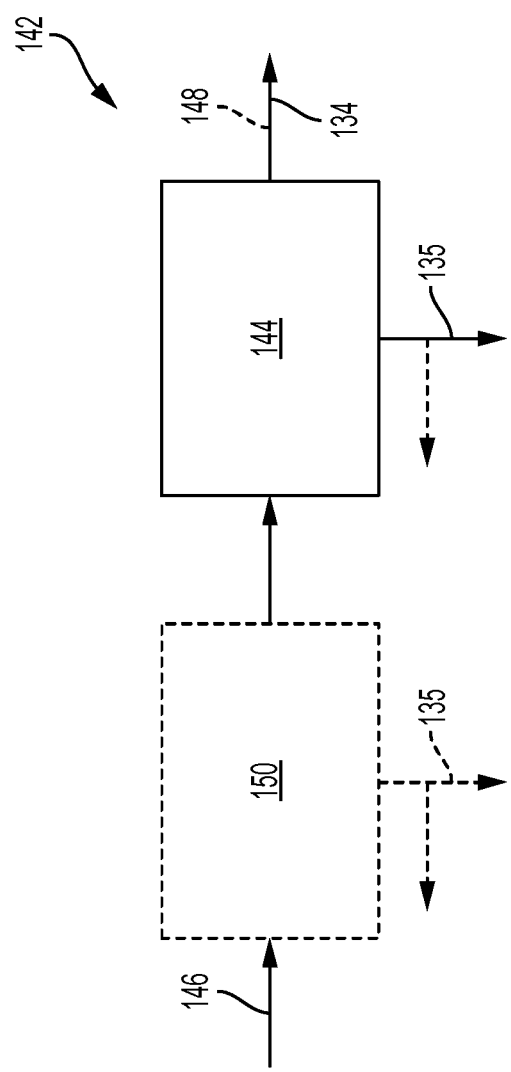
FIG. 7 is a schematic view of an example of a water removal assembly of the purification assembly of FIG. 6.

An example of a water removal assembly 128 is shown in FIG. 7, which is generally indicated at 142. Unless specifically excluded, water removal assembly 142 may include one or more components of other water removal assemblies and/or other assemblies described in this disclosure. Water removal assembly 142 may include at least one gas dryer 144, which may include any suitable structure configured to remove at least a substantial portion of water vapor from one or more streams 146, such as an output stream from a methane-producing assembly or an intermediate stream from an upstream gas removal assembly, to form an at least substantially dried stream 148. For example, gas dryer 144 may include one or more water-selective membranes, desiccant beds, refrigerant dryers, and/or other devices. Gas dryer 144 is preferred to include one or more refrigerant dryers, such as the Drypoint® RA series sold by Beko and SPL series sold by Parker.

In some embodiments, water removal assembly 142 may include at least one water knockout device 150 configured to remove at least a substantial portion of liquid water from stream 146. For example, when entrained liquid water is present in output stream(s) 146 in addition to water vapor, the water removal assembly may include one or more water knockout devices 150. Water removal assembly 142 may produce one or more reclaimed water streams 135 from the water vapor and/or liquid water removed from stream(s)

146. The reclaimed water streams may be discharged, pumped or otherwise transported to a feedstock delivery system, and/or stored, sent to drain, or otherwise disposed.

Figure 8:
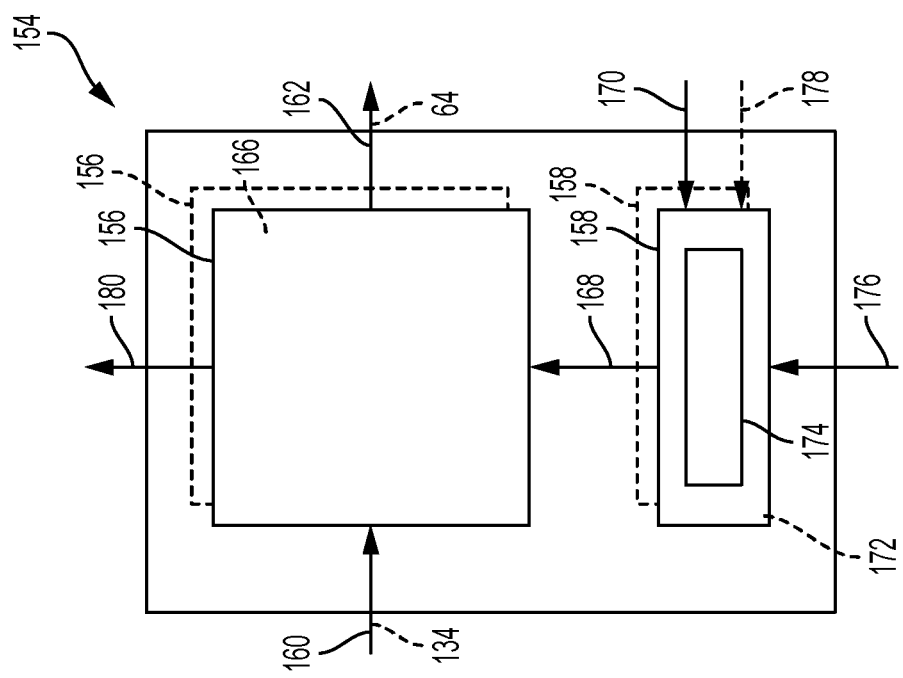
FIG. 8 is a schematic view of an example of a gas removal assembly of the purification assembly of FIG. 6.

An example of a gas removal assembly 130 is shown in FIG. 8, which is generally indicated at 154. Unless specifically excluded, gas removal assembly 154 may include one or more components of other gas removal assemblies described in this disclosure. Gas removal assembly 154 may include at least one gas removal region or reactor 156 and at least one heating assembly 158.

Gas removal reactor 156 may include any suitable structure configured to receive one or more feed streams, such as an at least substantially dried stream 160 (e.g., at least substantially dried stream 134) from water removal assembly 128, to produce one or more intermediate streams 162 or one or more methane-rich streams 64 containing a lower concentration of carbon oxide gas and hydrogen gas and/or a higher concentration of methane gas compared to the at least substantially dried stream(s). The gas removal reactor may produce the intermediate and/or methane-rich stream(s) via any suitable mechanism(s). For example, gas removal reactor 156 may generate those streams via a methanation reaction. When gas removal reactor 156 generates intermediate stream 162 and/or methane-rich stream 64 via a methanation reaction, that reactor may sometimes be referred to as a "methanation reactor," "synthetic natural gas reactor" or "SNG reactor."

The SNG reactor(s) may be operated between 250° C. and 450° C., and preferably between 290° C. and 380° C. Additionally, the operating pressure of the SNG reactor may be similar to the operating pressure of the HHR reactor, such as with only a minimal pressure drop between the HHR reactor and the SNG reactor. For example, the HHR reactor may operate between 20 psig to 100 psig and the SNG reactor may operate between 18 psig to 98 psig, which assumes a 2 psig pressure drop (reduction) due to components located between the two reactors (such as the heat exchanger and the gas dryer).

Gas removal reactor 156 may have any suitable design, such as a tubular or cylindrical design. Additionally, gas removal reactor 156 may include any suitable catalyst-containing bed or region to accelerate chemical reaction or conversion rates. When the gas removal mechanism is methanation, the gas removal reactor may include a suitable methanation catalyst 166 to facilitate production of intermediate stream(s) 162 and/or methane-rich stream(s) 64 from at least substantially dried stream(s) 160. Examples of suitable methanation catalysts include nickel-based catalysts (such as Reformax® RS-100 and HyProGen® R-70, both sold by Clariant, Louisville, Ky.; and MC-750R sold by Unicat, Houston, Tex.) and ruthenium-based catalysts (such as M-10 sold by Clariant, Louisville, Ky.).

Gas removal reactor 156 may be configured to convert a portion of carbon oxide gas and/or a portion of hydrogen gas in at least substantially dried stream 160 to methane gas and water. As an example, gas removal reactor 156 may be configured to convert carbon dioxide gas and hydrogen gas to methane gas and water as shown in the approximate chemical reaction below.

$$CO_2 + 4H_2 \rightarrow CH_4 + 2H_2O$$

As another example, gas removal reactor 156 may be configured to convert carbon monoxide gas and hydrogen gas to methane gas and water as shown in the approximate chemical reaction below.

$$CO + 3H_2 \rightarrow CH_4 + H_2O$$

The above equations are only examples and do not represent all the conversions and/or reactions that may occur in the gas removal reactor.

Gas removal assembly 156 may include two or more gas removal reactors 156, such as in series, to remove carbon oxide gas and/or hydrogen gas. In some embodiments, a water removal assembly may be upstream one or more gas removal reactors 156. In some embodiments, a water removal assembly may be upstream each gas removal reactor 156.

Gas removal assembly 154 also may include a temperature modulating assembly in the form of heating assembly 158. The heating assembly may be configured to produce at least one heated exhaust stream (or combustion stream) 168 from at least one heating fuel stream 170, typically as combusted in the presence of air. Heated exhaust stream 168 is schematically illustrated in FIG. 8 as heating gas removal reactor 156. Heating assembly 158 may include any suitable structure configured to generate the heated exhaust stream, such as a burner or combustion catalyst in which a fuel is combusted with air to produce the heated exhaust stream. The heating assembly may include an ignitor or ignition source 172 that is configured to initiate the combustion of fuel.

Heating assembly 158 may achieve and/or maintain any suitable temperatures in gas removal reactor 156. For example, heating assembly 158 may heat the gas removal reactor to at least a target operating temperature and/or at least a minimum conversion temperature. When gas removal reactor 156 removes gases via a methanation reaction (which is an exothermic reaction), the heat assembly may initially heat gas removal reactor to a target operating temperature and then only as necessary to maintain the gas removal reactor at a target operating temperature (such as because of heat loss, etc.).

In some embodiments, heating assembly 158 may include a burner assembly 174 and may be configured to receive at least one fuel stream 170 and to combust the fuel stream in the presence of air to provide one or more hot combustion streams 168 that may be used to heat the gas removal reactor. Air may be delivered to the heating assembly via a variety of mechanisms. For example, at least one air stream 176 may be delivered to the heating assembly as a separate stream, as shown in FIG. 8. Alternatively, or additionally, air stream 176 may be delivered to the heating assembly with at least one of the fuel streams 170 for heating assembly 158 and/or drawn from the environment within which the heating assembly is utilized.

Fuel stream 170 may include any combustible liquid(s) and/or gas(es) that are suitable for being consumed by heating assembly 158 to provide the desired heat output. In some embodiments, feedstock delivery system 36 may provide one or more fuel streams 170. Some fuel streams may be gases when delivered and combusted by heating assembly 158, while others may be delivered to the heating assembly as a liquid stream. Examples of suitable heating fuels for fuel streams 158 include carbon-containing feedstocks, low molecular weight condensable fuels, and low molecular weight hydrocarbons. Other examples include hydrogen gas and carbon oxide gas from byproduct stream(s) 178s. For example, one or more byproduct streams 178 from other components and/or assemblies of the fuel processing system may be used as a suitable heating fuel for fuel stream(s) 170.

Combustion stream(s) 168 may additionally, or alternatively, be used to heat other portions of the fuel processing system and/or other systems with which the heating assembly is used. After combustion stream 168 heats gas removal reactor 156 and/or other components and assemblies, the stream(s) may exit as combustion exhaust stream(s) 180.

Additionally, other configurations and types of heating assemblies 158 may be used. For example, heating assembly 158 may be an electrically powered heating assembly that is configured to heat gas removal reactor 156 by generating heat using at least one heating element (such as a resistive heating element), waste heat stream(s), solar heating, etc. In those embodiments, heating assembly 158 may not receive and combust a combustible fuel stream to heat gas removal reactor 156 to a suitable gas-removal temperature.

The heating assembly also may be configured to heat other components and/or assemblies, such as the feedstock delivery system, the feedstock supply streams, methane-producing assemblies, and/or other assemblies of the purification assembly, or any suitable combination of those systems, streams, and regions. The heating assembly may additionally be configured to heat other components of the refining assembly. For example, the heated exhaust stream may be configured to heat a pressure vessel and/or other canister containing the heating fuel and/or the hydrogen-production fluid that forms at least portions of the feed stream(s) and/or fuel stream(s).

Heating assembly 158 may be housed in an assembly shell or housing with the gas removal reactor. The heating assembly may be separately positioned relative to the gas removal reactor but in thermal and/or fluid communication with that component to provide the desired heating. Heating assembly 158 may be located partially or completely within the common shell, and/or at least a portion (or all) of the heating assembly may be located external that shell. When the heating assembly is located external the shell, the hot combustion gases from burner assembly 174 may be delivered via suitable heat transfer conduits to one or more components within the shell.

Although gas removal assembly 154 and methane-producing assembly 94 (in FIG. 2) are shown to each include a heating assembly, the gas removal and methane-producing assemblies may have a common heating assembly that may be located within the shell of the methane-producing assembly, within the shell of the gas removal assembly, or outside one or both those shells. When there is a common heating assembly between the gas removal assembly and the methane-producing assembly, the heating assembly may include suitable heat transfer conduits to transfer heat to the components of the gas removal and/or methane-producing assemblies. Additionally, when gas removal assembly 154 includes two or more gas removal reactors 156, the gas removal assembly may include a common heating assembly 158 for two or more of the gas removal reactors (and, in some embodiments, for all of the gas removal reactors). Moreover, although gas removal assembly 154 is shown to include a single gas removal reactor 156 and a single heating assembly 158, the gas removal assembly may include two or more gas removal reactors 156 and/or two or more heating assemblies 158, as shown in dashed lines in FIG. 8.

Figure 10:
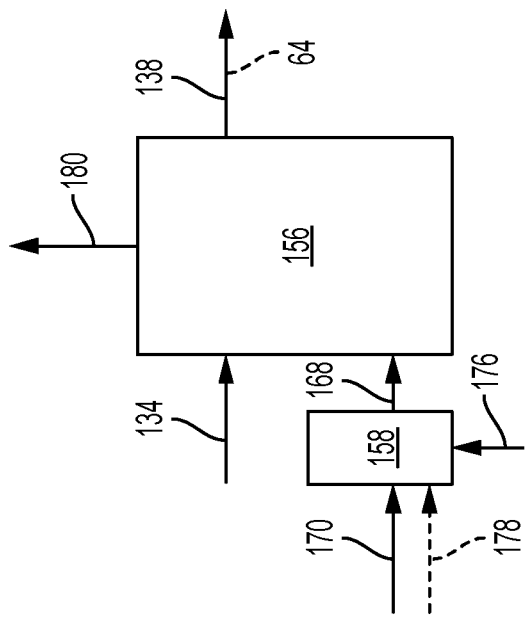
FIGS. 9-10 are schematic views of different configurations for the gas removal assembly of FIG. 8.
Figure 9:
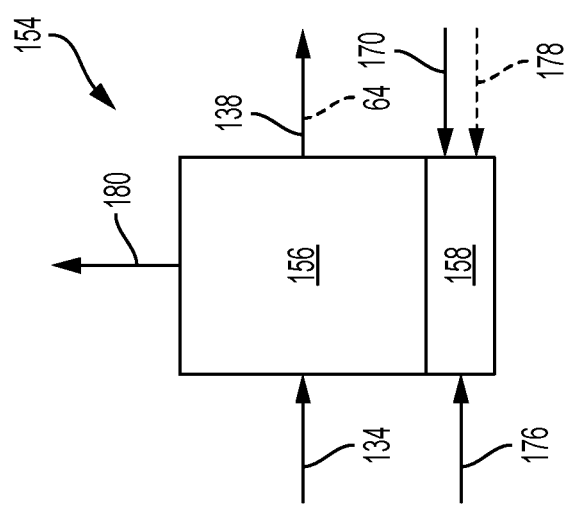

Gas removal reactor 156 and heating assembly 158 may be arranged in any suitable configuration. Examples of suitable configurations are shown in FIGS. 9-10. In FIG. 9, gas removal reactor 156 is disposed above heating assembly 158. In FIG. 10, heating assembly 158 is spaced from and adjacent to gas removal reactor 156.

Figure 11:
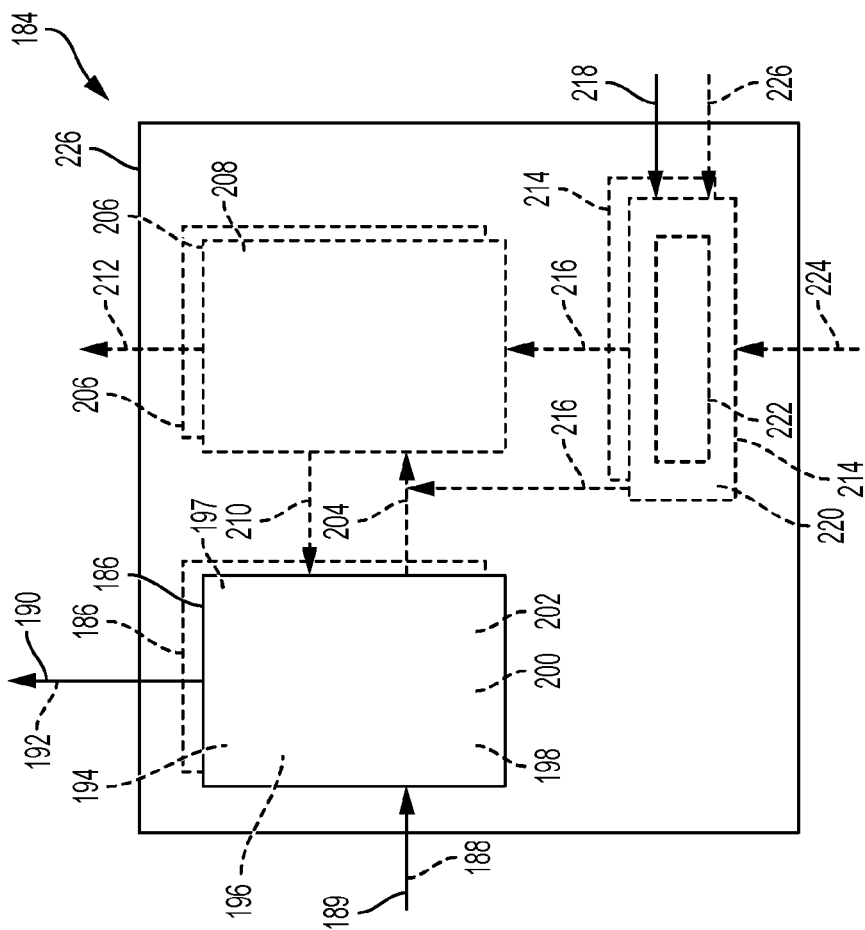
FIG. 11 is a schematic view of another example of a gas removal assembly of the purification assembly of FIG. 6.

Another example of a gas removal assembly 130 is shown in FIG. 11, which is generally indicated at 184. Unless specifically excluded, gas removal assembly 184 may include one or more components of other gas removal assemblies described in this disclosure. Gas removal assembly 184 may include at least one gas separation assembly 186.

Gas separation assembly 186 may include any suitable structure configured to separate carbon oxide gas and/or hydrogen gas from an at least substantially dried stream 188 (such as from an upstream water removal assembly) and/or from an intermediate stream 189 (such as from an upstream gas removal reactor) to produce a methane-rich stream 190 (e.g., methane-rich stream 64), or intermediate stream 192 if there are additional gas removal assemblies downstream, having a reduced concentration of carbon oxide gas and/or hydrogen gas and/or an increased concentration of methane gas compared to streams 188 and/or 189. For example, gas separation assembly 186 may include at least one absorber 194 configured to receive at least one chemical agent or absorbent 196 that is adapted to absorb at least a portion of carbon oxide gas and/or hydrogen gas from at least substantially dried stream 190 and/or from intermediate stream 192.

The absorber is configured to receive absorbent 196 and direct flow of streams 188 and/or 189 through the absorbent to absorb carbon oxide gas and/or hydrogen gas from those streams. As used herein, "absorb" means that carbon oxide gas and/or hydrogen gas is bound to or fixed by the absorbent through a reversible or irreversible process, and the bound carbon oxide gas and/or hydrogen gas may involve surface interactions with the absorbent, bulk interactions with the absorbent, or both. Absorbent 196 may be in liquid form, in solid form, or a combination. Suitable examples of absorbents for carbon oxide include any chemical or mix of chemicals that bind carbon oxide, such as metal hydroxides (e.g., sodium hydroxide, potassium hydroxide, calcium hydroxide, magnesium hydroxide, etc.); metal oxides (e.g., sodium oxide, potassium oxide, calcium oxide, magnesium oxide, iron oxide, etc.); organic amines, especially alkanolamines (e.g., monoethanolamine and diethanolamine, both liquids under normal conditions of temperature and pressure); aqueous solutions of metal hydroxides; Ascarite® (Thomas Scientific), CarboLime™ (Allied Health Products Inc.), and SodaLime (Airgas Corp.); immobilized organic amines (such as organic amines bound to polymeric substrates, especially polymeric beads); and mixtures of the above chemical agents.

Methane-rich stream 190 (or intermediate stream 192) leaving absorber 194 may include a reduced concentration of carbon oxide gas and/or hydrogen gas and/or an increased concentration of methane gas compared to at least substantially dried stream 188 and/or intermediate stream 189. Preferably, the methane-rich stream includes less than 5% carbon dioxide. Absorber 194 may be operated at a pressure of less than 100 psig, and preferably at a pressure that is between 10 psig and 50 psig.

When absorbent 196 is in solid form, absorber 194 may include two or more absorbent beds 197 and may be configured to direct flow of streams 188 and/or 189 to a first bed of those absorbent beds. When that bed is nearly saturated with carbon oxide gas and/or hydrogen gas, the absorber may be configured to direct flow to another bed of the absorbent beds to allow the absorbent of the previous absorbent bed to be recharged and/or regenerated. When absorbent 196 is in liquid form, the absorbent may be configured to absorb or bind carbon oxide gas and/or hydrogen gas at relatively low temperatures and then release or desorb the gas(es) at elevated temperatures.

Gas separation assembly 186 may alternatively, or additionally, include a membrane contactor assembly 198 that may include one or more permeable membranes 200 (such as one or more carbon oxide-selective membranes). The membrane contactor assembly 198 may be configured to separate carbon oxide gas and/or hydrogen gas from at least substantially dried stream 188 and/or from intermediate stream 189. For example, permeable membranes 200 may have relatively high permeability to carbon oxide gas and/or hydrogen gas relative to methane gas allowing carbon oxide gas and/or hydrogen from streams 190 and/or 192 to pass from a feed side to a permeate side of the permeable membranes.

Membrane contactor assembly 198 may additionally be configured to receive at least one liquid chemical agent or liquid absorbent 202 that is adapted to absorb at least a portion of carbon oxide gas and/or hydrogen gas from the carbon oxide gas and/or hydrogen gas separated from streams 188 and/or 189 (such as the carbon oxide gas and/or hydrogen gas that passes from the feed side to the permeate side of the permeable membranes). For example, the membrane contactor assembly may receive the absorbent on the permeate side of permeable membranes 200. Liquid absorbent 202 may be configured to absorb or bind carbon oxide gas and/or hydrogen gas at relatively low temperatures and then release or desorb the gas(es) at elevated temperatures. Examples of suitable liquid absorbents include alkanolamines, such as monoethanolamine or diethanolamine, or water solutions thereof. However, other organic amines, solutions of organic amines, or solutions of inorganic hydroxide salts and/or organic hydroxide salts may be used.

When gas separation assembly 186 includes absorber(s) 194 and/or permeable membrane(s) 200 that receive a liquid absorbent, the gas separation assembly may produce at least one liquid absorbent stream 204 having absorbed carbon oxide gas and/or hydrogen gas (which also may be referred to as "spent liquid absorbent stream(s)" or "gas laden liquid absorbent stream(s)." When spent liquid absorbent stream 204 is produced and the absorption of gas(es) in that stream is reversible, gas removal assembly 184 may additionally include at least one gas extraction assembly 206.

Gas extraction assembly 206 may include any suitable structure configured to extract (or desorb) the absorbed gases from liquid absorbent stream(s) 204. For example, gas extraction assembly 206 may include one or more strippers 208. In some embodiments, when the liquid absorbent includes absorbed carbon oxide gas and/or hydrogen gas, the gas extraction assembly may be configured to extract or desorb at least a substantial portion of the absorbed carbon oxide gas and/or hydrogen gas to form an at least substantially regenerated liquid absorbent stream (or stripped liquid absorbent stream) 210 with at least a substantial portion of the carbon oxide gas and/or hydrogen gas extracted, and an offgas stream 212 with the extracted carbon oxide gas and/or hydrogen gas.

Stripped liquid absorbent stream 210 may be pumped or otherwise transported to gas separation assembly 186 to further absorb carbon oxide gas and/or hydrogen gas from streams 190 and/or 192. Alternatively, or additionally, stripped liquid absorbent stream 210 may be stored for later use. Offgas stream 212 may be pumped or otherwise transported to one or more other components of the refining assembly, such as to supplement one or more heating fuel streams. Alternatively, offgas stream 212 may be stored, exhausted into the air, or otherwise disposed.

Gas extraction assembly 206 may use any suitable mechanism to regenerate liquid absorbent stream 204 having the absorbed gases. When the liquid absorbent used in gas separation assembly 186 is configured to absorb or bind carbon oxide gas and/or hydrogen gas at relatively low temperatures and then release or desorb the gas(es) at elevated temperatures, gas removal assembly 184 may further include at least one heating assembly 214. The heating assembly may be configured to produce at least one heated exhaust stream (or combustion stream) 216 from at least one heating fuel stream 218, typically as combusted in the presence of air. Heated exhaust stream 216 is schematically illustrated in FIG. 11 as heating gas extraction assembly 206. The heated exhaust stream may alternatively, or additionally, heat spent liquid absorbent stream 204 prior to gas extraction assembly 206, as shown in FIG. 11.

Heating assembly 214 may include any suitable structure configured to generate the heated exhaust stream(s), such as a burner or combustion catalyst in which a fuel is combusted with air to produce the heated exhaust stream(s). The heating assembly may include an ignitor or ignition source 220 that is configured to initiate the combustion of fuel. Heating assembly 214 may achieve and/or maintain in gas extraction assembly 206 and/or piping prior to that assembly any suitable temperatures. For example, heating assembly 214 may heat the gas extraction assembly to at least a target operating temperature and/or at least a minimum extraction or desorption temperature for the particular liquid absorbent used.

In some embodiments, heating assembly 214 may include a burner assembly 222 and may be configured to receive at least one fuel stream 218 and to combust the fuel stream in the presence of air to provide a hot combustion stream 216 that may be used to heat the gas removal reactor. Air may be delivered to the heating assembly via a variety of mechanisms. For example, an air stream 224 may be delivered to the heating assembly as a separate stream, as shown in FIG. 11. Alternatively, or additionally, air stream 224 may be delivered to the heating assembly with at least one of the fuel streams 218 for heating assembly 214 and/or drawn from the environment within which the heating assembly is utilized.

Fuel stream 218 may include any combustible liquid(s) and/or gas(es) that are suitable for being consumed by heating assembly 214 to provide the desired heat output. Some fuel streams may be gases when delivered and combusted by heating assembly 214, while others may be delivered to the heating assembly as a liquid stream. Examples of suitable heating fuels for fuel streams 218 include carbon-containing feedstocks, low molecular weight condensable fuels, and low molecular weight hydrocarbons. Other examples include hydrogen gas and/or carbon oxide gas from one or more byproduct streams 226. For example, one or more byproduct streams 226 from other components and/or assemblies of the fuel processing system may be used as a suitable heating fuel for fuel stream 218.

Combustion stream 216 may additionally, or alternatively, be used to heat other portions of the fuel processing system and/or other systems with which the heating assembly is used. Additionally, other configuration and types of heating assemblies 214 may be used. For example, heating assembly 214 may be an electrically powered heating assembly that is configured to heat gas extraction assembly 206 and/or piping upstream of that assembly by generating heat using at least one heating element (such as a resistive heating element), waste heat stream(s), solar heating, electric heating, etc. In those embodiments, heating assembly 214 may not receive and combust a combustible fuel stream to heat vaporizer to a suitable vaporization temperature and/or heat methane-producing reactor to a suitable methane-producing temperature.

The heating assembly also may be configured to heat other components and/or assemblies, such as a feedstock delivery system, the feedstock supply streams, methane-producing assemblies, and/or other assemblies of the purification assembly, or any suitable combination of those systems, streams, and regions. The heating assembly may additionally be configured to heat other components of the refining assembly. For example, the heated exhaust stream may be configured to heat a pressure vessel and/or other canister containing the heating fuel and/or the hydrogen-production fluid that forms at least portions of the feed and/or fuel streams for the fuel processing system.

Heating assembly 214 may be housed in an assembly shell or housing 226 with the gas separation and gas extraction assemblies. The heating assembly may be separately positioned relative to one or both of those assemblies but in thermal and/or fluid communication with one or both to provide the desired heating. Heating assembly 214 may be located partially or completely within the common shell, and/or at least a portion (or all) of the heating assembly may be located external that shell. When the heating assembly is located external the shell, the hot combustion gases from burner assembly 222 may be delivered via suitable heat transfer conduits to one or more components within the shell.

Although gas removal assembly 184 (in FIG. 11), gas removal assembly 154 (FIG. 8), and methane-producing assembly 94 (in FIG. 2) are shown to each include a heating assembly, gas removal assembly 184, gas removal assembly 154, and/or methane-producing assembly 94 may have a common heating assembly that may be located within the shell of the methane-producing assembly, within the shell of one or more of the gas removal assemblies, or outside those shells. When there is a common heating assembly between the gas removal assemblies and the methane-producing assembly, the heating assembly may include suitable heat transfer conduits to transfer heat to the components of the gas removal and/or methane-producing assemblies. Additionally, when gas extraction assembly 206 includes two or more strippers 208, the gas extraction assembly may include a common heating assembly 214 for two or more of the strippers (and, in some embodiments, for all of the strippers). Moreover, although gas removal assembly 184 is shown to include a single gas separation assembly 186, a single gas extraction assembly 206, and a single heating assembly 214, the gas removal assembly may include two or more gas separation assemblies, two or more gas extraction assemblies, and/or two or more heating assemblies, as shown in dashed lines in FIG. 11.

Figure 12:
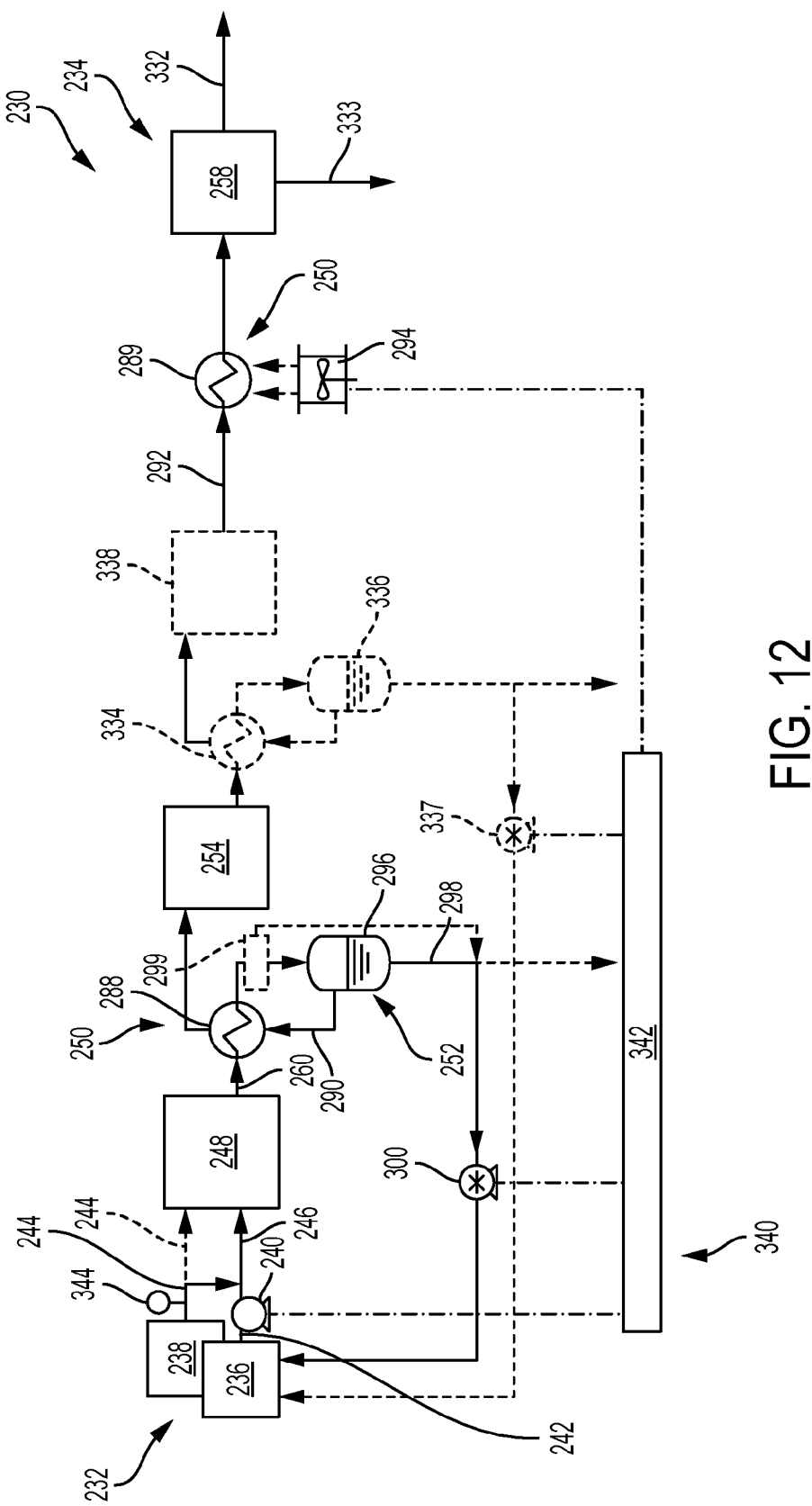
FIG. 12 is a schematic view of another example of a refining assembly for rich natural gas.

Another example of refining assembly 30 is shown in FIG. 12, which is generally indicated at 230. Unless specifically excluded, refining assembly 230 may include one or more components of the other refining assemblies and/or other assemblies in this disclosure. Refining assembly 230 may include a feedstock delivery system 232 and a fuel processing system 234.

Feedstock delivery system 232 may include any suitable structure configured to deliver one or more feed and/or fuel streams to one or more other components of refining assembly 230. For example, the feedstock delivery system may include a water source 236, a rich natural gas source 238, and a pump 240. The water source may be a storage tank, a storage container, a water reservoir, a natural body of water, etc. configured to provide a water stream 242 (such as a deionized water stream) to fuel processing system 234. Rich natural gas source 238 may be a wellhead, a storage tank, a storage container, etc. configured to provide a rich natural gas stream 244 to fuel processing system. Pump 240 may have any suitable structure configured to deliver or transport the water to fuel processing system 234. The rich natural gas stream 244 may combine with water stream 242 to form at least one liquid-containing feed stream 246. Alternatively, or additionally, the rich natural gas stream may be delivered or transported to fuel processing system 234 and combine with the water stream at the fuel processing system. In some embodiments, feedstock delivery system 232 may include one or more additional pumps and/or compressors to deliver or transport rich natural gas stream 244 to combine with water stream 242 and/or to fuel processing system 234.

Fuel processing system 234 may include any suitable structure configured to process rich natural gas stream(s) 244, such as to increase concentration of methane gas and/or reduce concentration of other components in the rich natural gas stream. For example, fuel processing system 234 may include at least one methane-producing assembly 248, a heat exchange assembly 250, a water removal assembly 252, a first gas removal assembly 254, and a second gas removal assembly 258.

Figure 13:
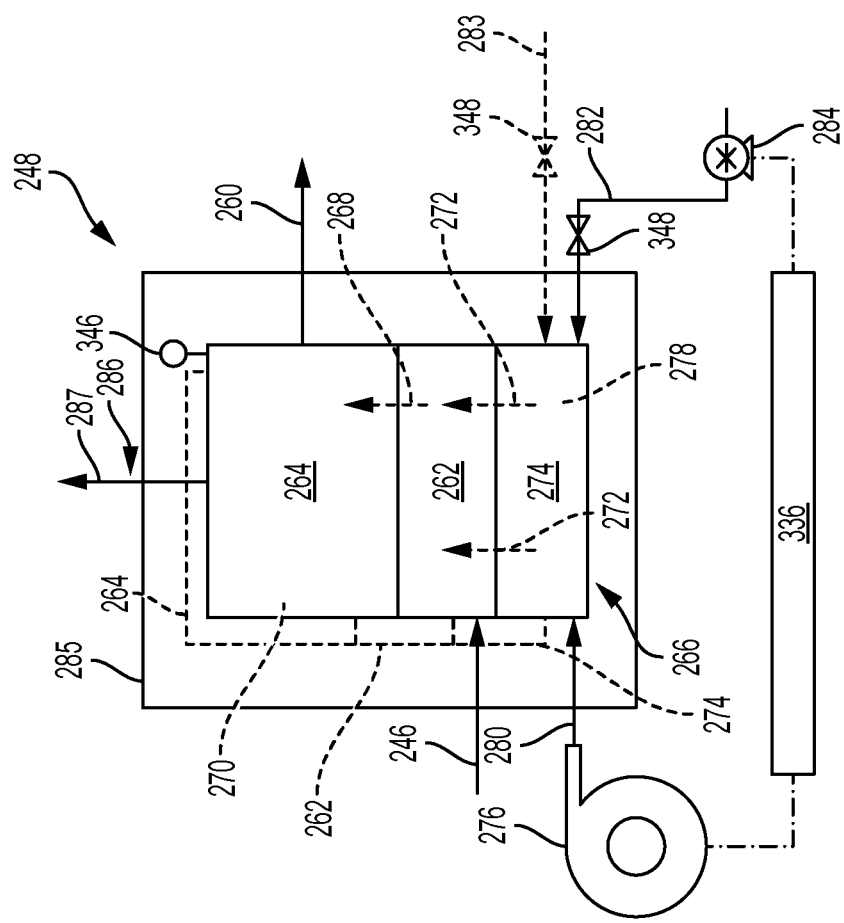
FIG. 13 is a schematic view of an example of a methane-producing assembly of the refining assembly of FIG. 12.

Methane-producing assembly 248 may include any suitable structure configured to receive liquid-containing feed stream(s) 246 (or water stream(s) 242 and rich natural gas stream(s) 244) and produce an output stream 260 containing methane gas as the primary component but also containing water and other gases. For example, methane-producing assembly 248 may include at least one vaporization region or vaporizer 262, at least one methane-producing region or reactor 264, and at least one heating assembly 266, as shown in FIG. 13.

Vaporizer 262 may include any suitable structure configured to receive and vaporize at least a portion of a liquid-containing feed stream, such as liquid-containing feed stream 246. For example, vaporizer 262 may be configured to at least partially transform liquid-containing feed stream 246 into one or more at least substantially vaporized streams 268. The at least substantially vaporized streams may, in some embodiments, include liquid(s). An example of a suitable vaporizer is a coiled tube vaporizer, such as a coiled stainless steel tube.

Methane-producing reactor 264 may include any suitable structure configured to receive one or more feed streams, such as at least substantially vaporized stream(s) 268 from the vaporizer, to produce one or more output streams 260 containing methane gas as a majority component, water, and other gases. The methane-producing reactor may produce the output stream via any suitable mechanism(s). For example, methane-producing reactor 264 may generate output stream(s) 260 via a heavy hydrocarbon reforming reaction. In that example, methane-producing reactor 264 may include a catalyst 270 configured to facilitate and/or promote the heavy hydrocarbon reforming reaction. When methane-producing reactor 264 generates output stream(s) 260 via a heavy hydrocarbon reforming reaction, methane-producing reactor may be referred to as a "heavy hydrocarbon reforming reactor" or "HHR reactor," and output stream 260 may be referred to as a "reformate stream."

Heating assembly 266 may include any suitable structure configured to produce at least one heated exhaust stream 272 for heating one or more other components of the methane-producing assembly. For example, the heating assembly may heat the vaporizer to any suitable temperature(s), such as at least a minimum vaporization temperature or the temperature in which at least a portion of the liquid-containing feed stream is vaporized to form the at least substantially vaporized stream. Additionally, or alternatively, heating assembly 266 may heat the methane-producing reactor to any suitable temperature(s), such as at least a minimum methane-producing temperature or the temperature in which at least a portion of the vaporized feed stream is reacted to produce methane gas to form the output stream. The heating assembly may be in thermal communication with one or more other components of the methane-producing assembly, such as the vaporizer and/or methane-producing reactor.

The heating assembly may include a burner assembly 274, at least one air blower 276, and an igniter assembly 278, as shown in FIG. 13. The burner assembly may include any suitable structure configured to receive at least one air stream 280 and at least one fuel stream 282 and to combust the at least one fuel stream to produce heated exhaust stream(s) 272. The fuel stream may be provided by feedstock delivery system 232 and/or one or more of the gas removal assemblies. For example, one or more gas removal assemblies that remove carbon oxide gas and/or hydrogen gas may send those gases to burner assembly 274 as a byproduct fuel stream 283.

Fuel streams 282 and/or 283 may be delivered to burner assembly 274 via a pump 284 and/or other suitable device. If fuel streams 282 and/or 283 are available at sufficient pressure, pump 284 may not be necessary and may be excluded. Although pump 284 is shown to transport fuel stream 282 and not byproduct fuel stream 283 to burner assembly 274, the pump may alternatively, or additionally, transport byproduct fuel stream 283 to burner assembly 274, or one or more other pumps may transport the byproduct fuel stream to the burner assembly. Diaphragm and piston pumping mechanisms are examples of suitable pumps for use as pump 284, although other types of pumps and compressors may be used. Air blower 276 may include any suitable structure configured to generate air stream(s) 280. Igniter assembly 278 may include any suitable structure configured to ignite fuel stream(s) 282 and/or 283. Although methane-producing assembly 248 is shown to include a single vaporizer 262, a single methane-producing reactor 264, and a single heating assembly 266, the methane-producing assembly may include two or more vaporizers 262, two or more methane-producing reactors 264, and/or two or more heating assemblies 266, as shown in dashed lines in FIG. 13.

In some embodiments, methane-producing assembly 248 may include a shell or housing 285 which may at least partially contain one or more other components of that assembly. For example, shell 285 may at least partially contain vaporizer 262, methane-producing reactor 264, and/or heating assembly 266, as shown in FIG. 13. Shell 285 may include one or more exhaust ports 286 configured to discharge at least one combustion exhaust stream 287 produced by heating assembly 266. The shell or housing may include insulation and/or a jacket.

Referring back to FIG. 12, heat exchange assembly 250 may include one or more heat exchangers configured to transfer heat from one portion of the refining assembly to one or more other portion(s). For example, heat exchange assembly 250 may include a first heat exchanger 288 and a second heat exchanger 289. The first heat exchanger may be configured to transfer heat from output stream 260 to an at least substantially dried stream 290 exiting water removal assembly 252 to raise the temperature of the substantially dried stream prior to gas removal assembly 254, as well as to cool output stream 260 prior to water removal assembly 252. Second heat exchanger 289 may be configured to cool an intermediate stream 292 exiting an upstream gas removal assembly (such as first gas removal assembly 254) prior to another gas removal assembly (such as second gas removal assembly 258). For example, second heat exchanger 289 may cool intermediate stream 292 to less than or equal to 100° C., and preferably less than or equal to 50° C. In some embodiments, heat exchange assembly 250 may include one or more fans 294 to cool one or more streams passing through the first and/or second heat exchangers. Although second heat exchanger 289 is shown to receive only the cooling stream(s) from fan(s) 294, that heat exchanger may alternatively, or additionally, receive one or more other cooling fluid streams (such as from one or more other portions or components of the refining assembly)

Water removal assembly 252 may include any suitable structure configured to remove water from output stream 260 to produce at least substantially dried stream 290. For example, water removal assembly 252 may include at least one gas dryer 296 configured to remove at least a substantial portion of water vapor from output stream 260 and to form at least one reclaimed water stream 298 from the removed water vapor. In some embodiments, the water removal assembly may include at least one water knockout device 299 configured to remove at least a substantial portion of liquid water from output stream 260. When refining assembly 230 includes one or more water knockout device(s) 299, those devices may be immediately upstream of (or immediately prior to) the gas dryer(s) and may produce at least a portion of reclaimed water stream 298 from the removed water. In some embodiments, water removal assembly 252 may include a reclaimed water pump 300 configured to move or transport the reclaimed water stream to feedstock delivery system 232, such as to add or supplement water to water source 236. The reclaimed water stream(s) also may be sent to one or more other components of refining assembly 230, sent to drain, and/or otherwise disposed.

First gas removal assembly 254 may include any suitable structure configured to remove one or more other gases (such as gas(es) other than methane gas) from one or more streams, such as at least substantially dried stream(s) 290, and to produce one or more intermediate streams 292 having a lower concentration of the other gases and/or a higher concentration of methane gas. In some embodiments, intermediate stream(s) 292 may include less than 5% hydrogen gas, and preferably less than 3% hydrogen gas. For example, first gas removal assembly 254 may include at least one gas removal region or reactor 302 and at least one heating assembly 304, as shown in FIG. 14.

Gas removal reactor 302 may include any suitable structure configured to receive one or more at least substantially dried streams 290, and to produce one or more intermediate streams 292. The gas removal reactor may produce the intermediate stream via any suitable mechanism(s). For example, gas removal reactor 302 may generate intermediate stream(s) 292 via a methanation reaction. In that example, gas removal reactor 302 may include a catalyst 306 configured to facilitate and/or promote the methanation reaction. When gas removal reactor 302 generates intermediate stream(s) 292 via a methanation reaction, the gas removal reactor may be referred to as a "synthetic natural gas reactor" or "SNG reactor."

Heating assembly 304 may include any suitable structure configured to produce at least one heated exhaust stream 308 for heating one or more other components of the gas removal assembly. For example, the heating assembly may heat the gas removal reactor to any suitable temperature(s), such as at least a minimum methanation or the temperature in which at least a portion of the carbon oxide gas and hydrogen gas in the at least substantially dried stream is reacted to produce methane gas and water to form the intermediate stream. The heating assembly may be in thermal communication with one or more other components of the gas removal assembly, such as the gas removal reactor.

Figure 14:
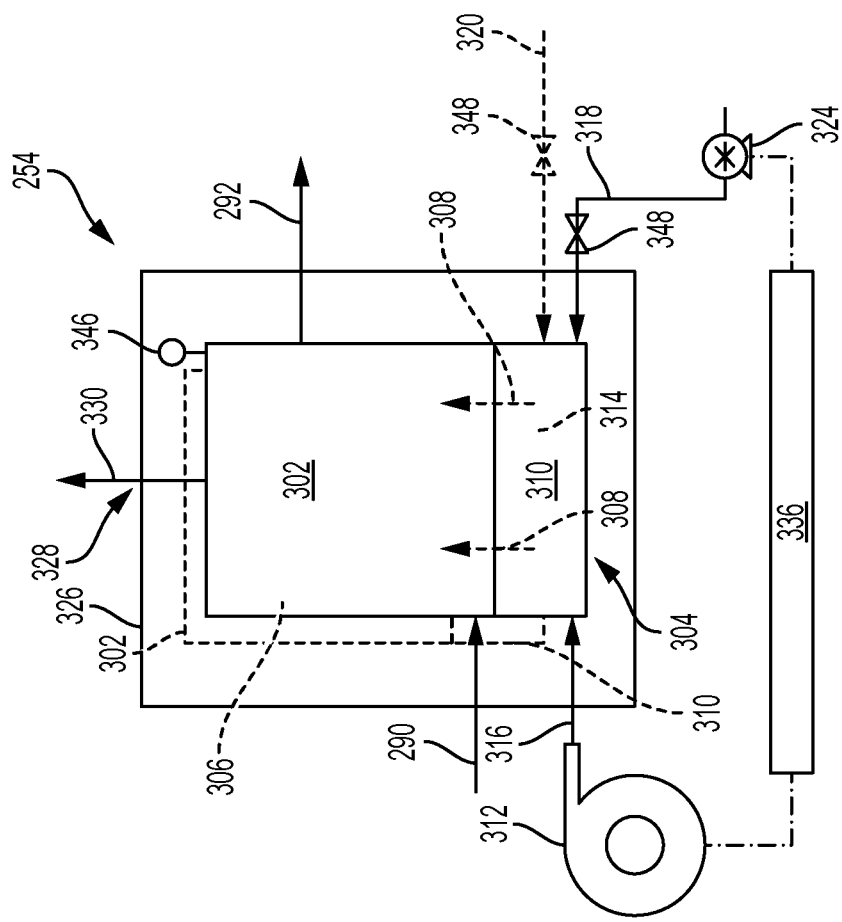
FIG. 14 is a schematic view of an example of a gas removal assembly of the refining assembly of FIG. 12.

The heating assembly may include a burner assembly 310, at least one air blower 312, and an igniter assembly 314, as shown in FIG. 14. The burner assembly may include any suitable structure configured to receive at least one air stream 316 and at least one fuel stream 318 and to combust the at least one fuel stream to produce heated exhaust stream(s) 308. The fuel stream may be provided by feedstock delivery system 232 and/or one or more other gas removal assemblies. For example, one or more gas removal assemblies that remove carbon oxide gas and/or hydrogen gas may send those gases to burner assembly 310 as a byproduct fuel stream 320.

Fuel streams 318 and/or 320 may be delivered to burner assembly 310 via one or more pumps 324 and/or other suitable device. If fuel streams 318 and/or 320 are available at sufficient pressure, pump 324 may not be necessary and may be excluded. Although pump 324 is shown to transport fuel stream 318 and not byproduct stream 320 to burner assembly 310, the pump may alternatively, or additionally, transport byproduct fuel stream 320 to burner assembly 310, or one or more other pumps may transport the byproduct fuel stream to the burner assembly. Diaphragm and piston pumping mechanisms are examples of suitable pumps for use as pump 324, although other types of pumps and compressors may be used. Air blower 312 may include any suitable structure configured to generate air stream(s) 316. Igniter assembly 314 may include any suitable structure configured to ignite stream(s) 318 and/or 320. Although gas removal assembly 254 is shown to include a single gas removal reactor 302 and a single heating assembly 304, the gas removal assembly may include two or more gas removal reactors 302 and/or two or more heating assemblies 304, as shown in dashed lines in FIG. 14.

In some embodiments, gas removal assembly 254 may include a shell or housing 326 which may at least partially contain one or more other components of that assembly. For example, shell 326 may at least partially contain gas removal reactor 302 and/or heating assembly 304, as shown in FIG. 14. Shell 326 may include one or more exhaust ports 328 configured to discharge at least one combustion exhaust stream 330 produced by heating assembly 304. Shell or housing 326 may include insulation and/or a jacket.

Referring back to FIG. 12, refining assembly 230 may, in some embodiments, include one or more additional heat exchangers 334, one or more additional water removal assemblies 336 (having one or more pumps 337 for transporting reclaimed water to the feedstock delivery system), and one or more additional gas removal assemblies 338. Water removal assemblies 336 and/or gas removal assemblies 338 may be the same or different from water removal assembly 252 and first gas removal assembly 254, respectively. For example, water removal assembly 336 may include a gas dryer. Additionally, gas removal assembly 338 may include a gas removal reactor, such as a SNG reactor. Alternatively, gas removal assembly 338 may include one or more components of second gas removal assembly 258 described below. Although only a single heat exchanger 334, a single water removal assembly 336, and a single gas removal assembly 338 is shown in FIG. 12, refining assembly 230 may include additional heat exchangers, water removal assemblies, and gas removal assemblies, which may be in series and/or in parallel with heat exchanger 334, water removal assembly 336, and gas removal assembly 338. The additional water removal assemblies and gas removal assemblies may be the same or different from water removal assembly 336 and gas removal assembly 338, respectively.

Second gas removal assembly 258 may include any suitable structure configured to remove one or more other gases (such as gas(es) other than methane gas) from one or more streams, such as intermediate stream(s) 292 to form at least one methane-rich stream 332, which may include a greater methane concentration than intermediate stream(s) 292 and/or a reduced concentration of one or more other gases (or impurities) that were present in the intermediate stream(s). In some embodiments, the second gas removal assembly may form at least one byproduct stream 333 with the removed gases. Examples of second gas removal assemblies 258 are described below.

Refining assembly 230 may, in some embodiments, include a control system 340, which may include any suitable structure configured to control and/or monitor operation of the refining assembly. For example, control system 340 may include a control assembly 342, one or more flow measurement devices 344, one or more temperature measurement devices 346, and one or more control valves 348, as shown in FIGS. 12-13.

Control assembly 342 may detect flow rate of rich natural gas stream 244 and adjust delivery (such as the flow rate) of water stream 242 based, at least in part, on the detected flow rate. Additionally, control assembly 342 may detect temperatures in the methane-producing reactor and/or gas removal reactor via temperature measurement devices 346 (such as thermocouples and/or other suitable devices) and adjust flow rate of the fuel stream(s) and/or byproduct fuel stream(s) via control valves 348 and/or adjust flow rate of the air stream(s) by controlling speed of the air blower(s), based, at least in part, on the detected temperature(s). For example, control assembly 342 may increase flow rate of the fuel stream(s) and/or byproduct fuel stream(s) via control valve(s) 348, if the detected temperature is lower than a minimum temperature (such as a minimum methane-producing temperature or a minimum gas removal temperature). Additionally, control assembly 342 may decrease flow rate of the fuel stream(s) and/or byproduct fuel stream(s) via control valve(s) 348 and/or increase the speed of the air blower(s), if the detected temperature is higher than a maximum temperature (such as a maximum methane-producing temperature or a maximum gas removal temperature).

In some embodiments, control system 340 may include one or more other measurement devices, such as to measure sulfur breakthrough in the rich natural gas stream, conductivity (or resistivity) of the deionized water in the water stream, pump motor speed(s), pump discharge flow rate(s), operating temperature(s), operating pressure(s), etc. Control assembly 342 may provide early warning of a impending need for maintenance based, at least in part, on one or more measurement devices. In some embodiments, control system 340 may provide for remote monitoring and control of one or more components of refining assembly 230.

Figure 15:
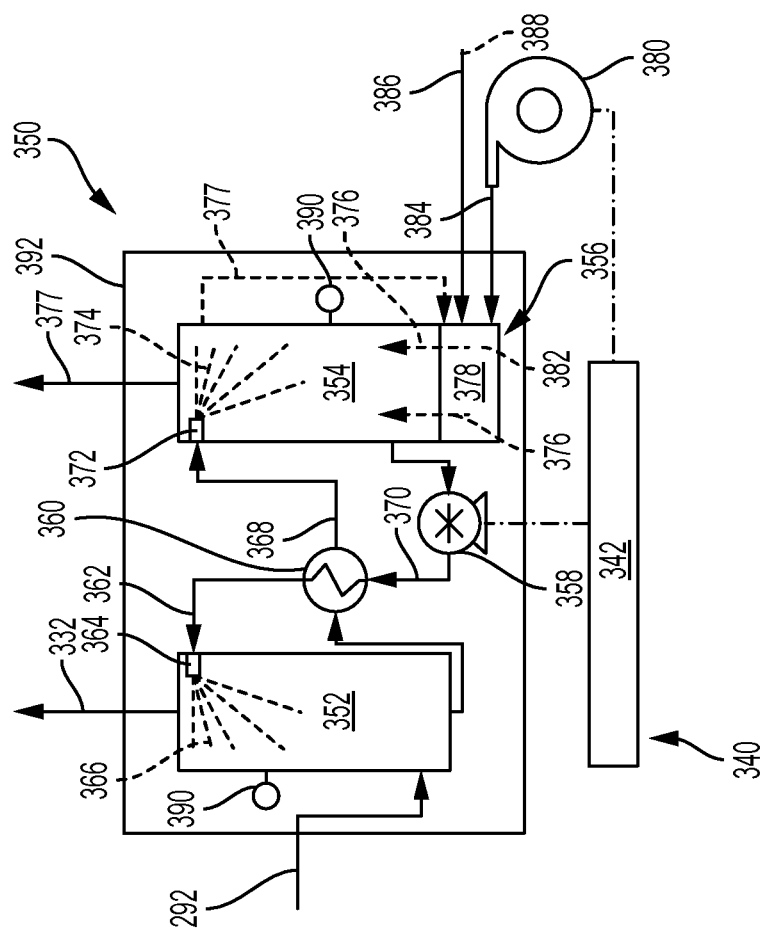
FIG. 15 is a schematic view of another example of a gas removal assembly of the refining assembly of FIG. 12.

An example of second gas removal assembly 258 is shown in FIG. 15, which is generally indicated at 350. Unless specifically excluded, second gas removal assembly 258 may include one or more components of the other gas removal assemblies and/or other assemblies in this disclosure. Gas removal assembly 350 may include at least one absorber 352, at least one stripper 354, at least one heating assembly 356, at least one pump 358, and at least one heat exchanger 360.

Absorber 352 may include any suitable structure configured to receive a liquid absorbent stream 362 that is adapted to absorb at least a portion of carbon oxide gas and/or hydrogen gas from one or more streams, such as intermediate stream(s) 292, and/or to direct flow of those streams (such as intermediate stream 292) through the liquid absorbent stream. For example, absorber 352 may include at least one spray nozzle 364 configured to at least partially atomize the liquid absorbent stream into one or more sprayed liquid absorbent streams 366. The absorber may be configured to direct flow of intermediate stream(s) 292 through sprayed liquid absorbent stream(s) 366 in any suitable flow configuration, such as counter-current flow, cross-current flow, or parallel flow. As intermediate stream(s) 292 flows through the sprayed liquid absorbent stream(s), carbon oxide gas and/or hydrogen gas may, at least partially, be absorbed by the sprayed stream(s) to form methane-rich stream 332 without the absorbed carbon oxide gas and/or hydrogen gas and a spent liquid absorbent stream 368 having the absorbed carbon oxide gas and/or hydrogen gas. Absorber 352 may be operated at a pressure of less than 100 psig, and preferably at a pressure between 10 psig and 50 psig.

Although FIG. 15 shows absorber 352 with spray nozzle(s) 364, another suitable configuration is to return liquid absorbent stream 362 without using a spray nozzle. For example, liquid absorbent stream 362 may enter a top, middle, or bottom portion of absorber 352 through a suitable tube or pipe connection, and the liquid absorbent may be allowed to accumulate a fill a volume at the bottom of the absorber. Intermediate stream 292 may be directed to bubble up through the volume of the liquid absorbent to remove at least a portion of carbon oxide gas and/or hydrogen gas to form methane-rich stream 332.

Stripper 354 may include any suitable structure configured to receive one or more spent liquid absorbent streams 368, strip the absorbed carbon oxide gas and/or hydrogen gas from those stream(s), and/or deliver one or more stripped liquid absorbent streams 370 to absorber(s) 352. For example, stripper 354 may include at least one spray nozzle 372 configured to at least partially atomize the spent liquid absorbent stream into one or more sprayed spent liquid absorbent streams 374. Stripper 354 may strip the absorbed carbon oxide gas and/or hydrogen gas via any suitable mechanism(s). For example, when the liquid absorbent(s) used for liquid absorbent stream 362 absorbs or binds carbon oxide gas and/or hydrogen gas within a first temperature range and releases or desorbs carbon oxide gas and/or hydrogen gas within a second temperature range higher than the first temperature range, then stripper 354 may be configured to receive one or more heated exhaust streams 376 from heating assembly 356 and direct the flow of those streams through the sprayed spent liquid absorbent stream(s).

For example, the sprayed spent liquid stream(s) may be heated by the heated exhaust stream(s) between 60° C. and 200° C., and preferably between 80° C. and 150° C., to drive off the absorbed carbon oxide gas and/or hydrogen gas to produce or yield at least substantially regenerated liquid absorbent stream 370. The released of desorbed gasses may form at least one offgas stream 377. Stripper 354 may be operated within the range of 0 psig and 50 psig, and preferably 0 psig and 10 psig.

Heating assembly 356 may include any suitable structure configured to produce at least one heated exhaust stream 376 for heating sprayed spent liquid absorbent stream(s) 374. For example, the heating assembly may heat the stripper to any suitable temperature(s), such as at least a minimum release or desorption temperature for the carbon oxide gas and/or hydrogen gas in the sprayed spent liquid absorbent stream(s).

The heating assembly may include a burner assembly 378, at least one air blower 380, and an igniter assembly 382, as shown in FIG. 15. The burner assembly may include any suitable structure configured to receive at least one air stream 384 and at least one fuel stream 386 and to combust the at least one fuel stream to produce heated exhaust stream(s) 376. The fuel stream may be provided by feedstock delivery system 232 and/or one or more of the gas removal assemblies. For example, one or more gas removal assemblies that remove carbon oxide gas and/or hydrogen gas may send those gases to burner assembly 378 as a byproduct fuel stream 388. Additionally, at least a portion of offgas stream 377 may be used as that byproduct fuel stream. Fuel streams 386 and/or 388 may be delivered to burner assembly 378 via a pump and/or other suitable device. Air blower 380 may include any suitable structure configured to generate air stream(s) 384. Igniter assembly 382 may include any suitable structure configured to ignite fuel stream(s) 386 and/or 388.

Figure 16:
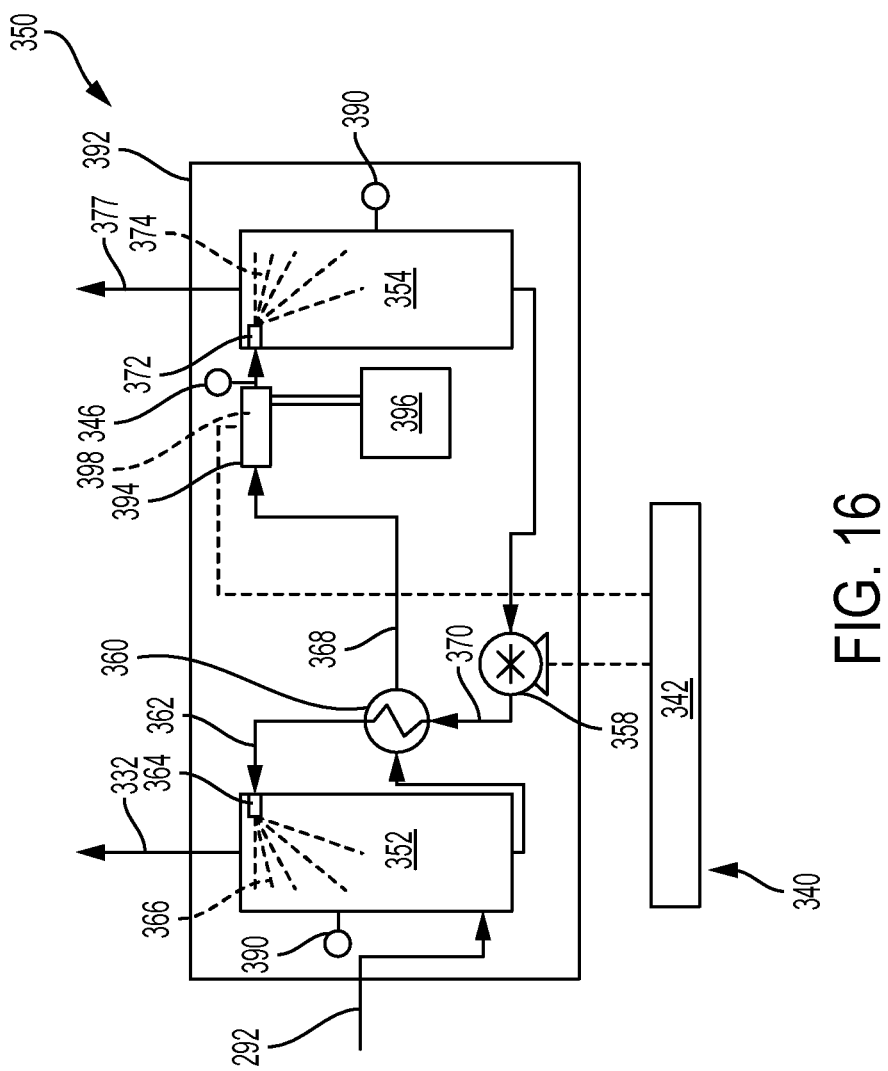
FIG. 16 is a schematic view of a further example of a gas removal assembly of the refining assembly of FIG. 12.

Additionally, other configuration and types of heating assemblies 356 may be used. For example, heating assembly 356 may include at least one heater 394 that is powered by at least one power assembly 396, as shown in FIG. 16. Heater 394 may include at least one heating element 398 (such as a resistive heating element). The heating element may heat spent liquid absorbent stream 368 prior to stripper 354 (and/or spray nozzle 372) and/or may heat the spent liquid absorbent stream in the stripper. Power assembly 396 may include one or more electric cords (to allow a user to plug the heater into an electrical outlet), solar panels, wind turbines, fuel cells, etc.

Pump 358 may include suitable structure configured to deliver or transport stripped liquid absorbent stream(s) 370 to absorber 352 (such as through spray nozzle 364 or a suitable tube or pipe connection) for absorption of at least a portion of carbon oxide gas and/or hydrogen gas from intermediate stream(s) 292. Heat exchanger 360 may include any suitable structure configured to transfer heat from the stripped liquid absorbent stream(s) to the spent liquid absorbent stream(s).

In some embodiments, control system 340 may further include one or more fluid level measurement devices 390, as shown in FIG. 15. Control assembly 342 may detect fluid level in absorber 352 and/or stripper 354 via fluid level measurement devices 390, and control the speed of pump 358 based, at least in part, on the detected fluid level(s). For example, control assembly 342 may reduce the speed of pump 358 (or the flow rate of stripped liquid absorbent stream 370) when fluid level in absorber 342 is above a predetermined maximum level or the fluid level in stripper 354 is below a predetermined minimum level. Additionally, control assembly 342 may increase the speed of pump 358 when fluid level in absorber 342 is below a predetermined minimum level or the fluid level in stripper 354 is above a predetermined maximum level. Moreover, control assembly 342 may detect the temperature of spent liquid absorbent stream 368 after that stream is heated by heater 394 (e.g., prior to stripper 354 or in stripper 354) in FIG. 16 via temperature measurement devices 346, and control the temperature setting and/or power to the heater based, at least in part, on the detected temperature. For example, control assembly 342 may increase heat provided by the heater if the detected temperature is below a minimum release temperature for the absorbed carbon oxide gas and/or hydrogen gas.

In some embodiments, gas removal assembly 350 may include a shell or housing 392 which may at least partially contain one or more other components of that assembly. For example, shell 392 may at least partially contain absorber 352, stripper 354, heating assembly 356, pump 358, and/or heat exchanger 360, as shown in FIGS. 15-16. The shell or housing may include insulation and/or a jacket.

Figure 17:
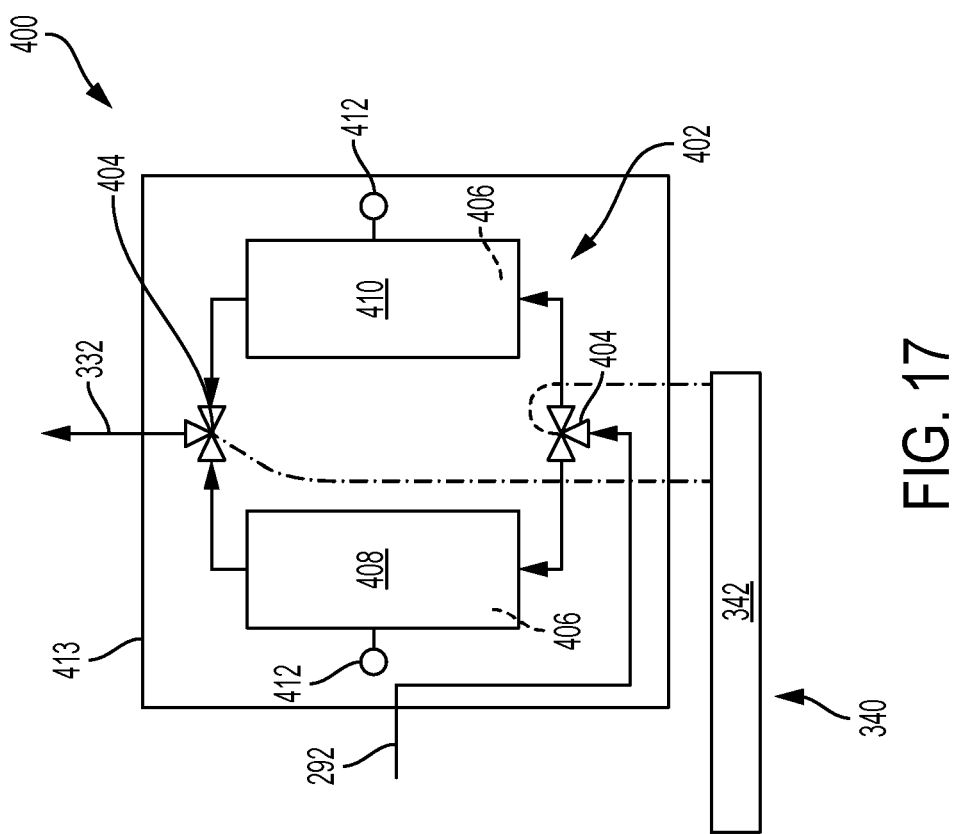
FIG. 17 is a schematic view of another example of a gas removal assembly of the refining assembly of FIG. 12.

Another example of second gas removal assembly 258 is shown in FIG. 17, which is generally indicated at 400. Unless specifically excluded, second gas removal assembly 400 may include one or more components of the other gas removal assemblies in this disclosure. Second gas removal assembly 400 may include one or more absorbers 402 and control valves 404.

Absorbers 402 may include at least one solid absorbent 406 (such as in solid absorbent beds) adapted to absorb at least a portion of carbon oxide gas and/or hydrogen gas from one or more streams, such as intermediate stream(s) 292, and/or to direct flow of those streams through the solid absorbent. As intermediate stream(s) 292 flow through the solid absorbent, carbon oxide gas and/or hydrogen gas may, at least partially, be absorbed forming methane-rich stream 332 without the absorbed carbon oxide gas and/or hydrogen gas. Second gas removal assembly 400 may include any suitable number of absorbers 402. For example, the second gas removal assembly may include a first absorber 408 and a second absorber 410, as shown in FIG. 17. Although second gas removal assembly 400 is shown to include two absorbers 402, the assembly may include any suitable number of absorbers, such as one absorber or three or more absorbers.

When second gas removal assembly 400 includes two or more absorbers 402, the second gas removal assembly may include two or more control valves 404, which may include any suitable structure configured to isolate one or more absorbers 402 and/or direct flow to one or more other absorbers 402. For example, intermediate stream 292 may be directed to flow through first absorber 408 until the solid absorbent in that absorber is saturated or substantially saturated with carbon oxide gas and/or hydrogen gas. At that point, control valves 404 may isolate first absorber 408 and direct flow of intermediate stream 292 through second absorber 410 until the solid absorbent in the second absorber is saturated or substantially saturated. The solid absorbent in the isolated first absorber may be recharged or regenerated while intermediate stream 292 is flowing through the second absorber, or vice-versa. In some embodiments, control valves 404 may be three-way valves directing flow of intermediate stream 292 to either the first or second absorbers and/or directing flow of methane-rich stream 332 from either the first or second absorbers.

In some embodiments, control system 340 may include one or more saturation measurement devices 412. In those embodiments, control assembly 342 may control operation of control valves 404 based, at least in part, on the detected saturation. For example, control assembly 342 may control the control valves to direct flow from a first absorber to a second absorber when the first absorber is above a predetermined maximum saturation level. In some embodiments, gas removal assembly 400 may include a shell or housing 413 which may at least partially contain one or more other components of that assembly. For example, shell 413 may at least partially contain absorbers 402 and control valves 404, as shown in FIG. 17. The shell or housing may include insulation and/or a jacket.

Figure 18:
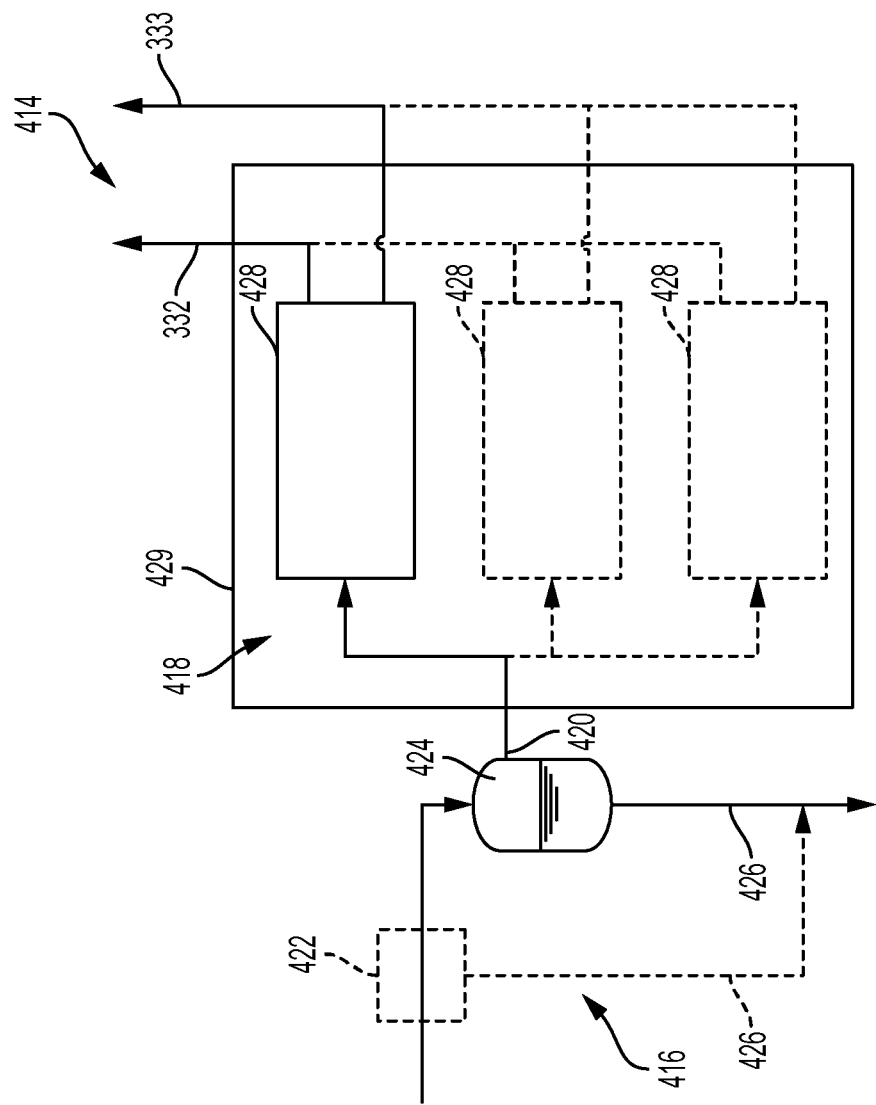
FIG. 18 is a schematic view of a further example of a gas removal assembly of the refining assembly of FIG. 12.

Another example of second gas removal assembly 258 is shown in FIG. 18, which is generally indicated at 414. Unless specifically excluded, second gas removal assembly 414 may include one or more components of the other gas removal assemblies and/or other assemblies in this disclosure. Second gas removal assembly 414 may include a water removal assembly 416 and a membrane assembly 418.

Water removal assembly 416 may include any suitable structure configured to remove water vapor and/or liquid water from one or more streams, such as intermediate stream 292, to form an at least substantially dried stream 420. For example, water removal assembly 416 may include at least one water knockout device 422 and/or at least one gas dryer 424. Water removed by water removal assembly 416 may form at least one reclaimed water stream 426 that may be sent to feedstock delivery system 232 and/or other components of refining assembly 230.

Membrane assembly 418 may include any suitable structure configured to separate at least a portion of carbon oxide gas and/or hydrogen gas from at least substantially dried stream 420 to form methane-rich stream 332. The separated carbon oxide gas and/or hydrogen gas may form byproduct stream 333, which may be sent to feedstock delivery system 232, one or more heating assemblies of other gas removal assemblies, and/or other components of refining assembly 230. For example, membrane assembly 418 may include one or more carbon oxide selective membranes 428 that are configured to separate at least a portion of carbon oxide gas and/or hydrogen gas from stream(s) 420. Membrane assembly 418 may include any suitable number of membranes 428, as shown in dashed lines in FIG. 18. When membrane assembly 418 includes two or more membranes 428, those membranes may be arranged in parallel or in series. In some embodiments, gas removal assembly 414 may include a shell or housing 429 which may at least partially contain one or more other components of that assembly. For example, shell 429 may at least partially contain membrane assembly 418, as shown in FIG. 18. The shell or housing may include insulation and/or a jacket.

Figure 19:
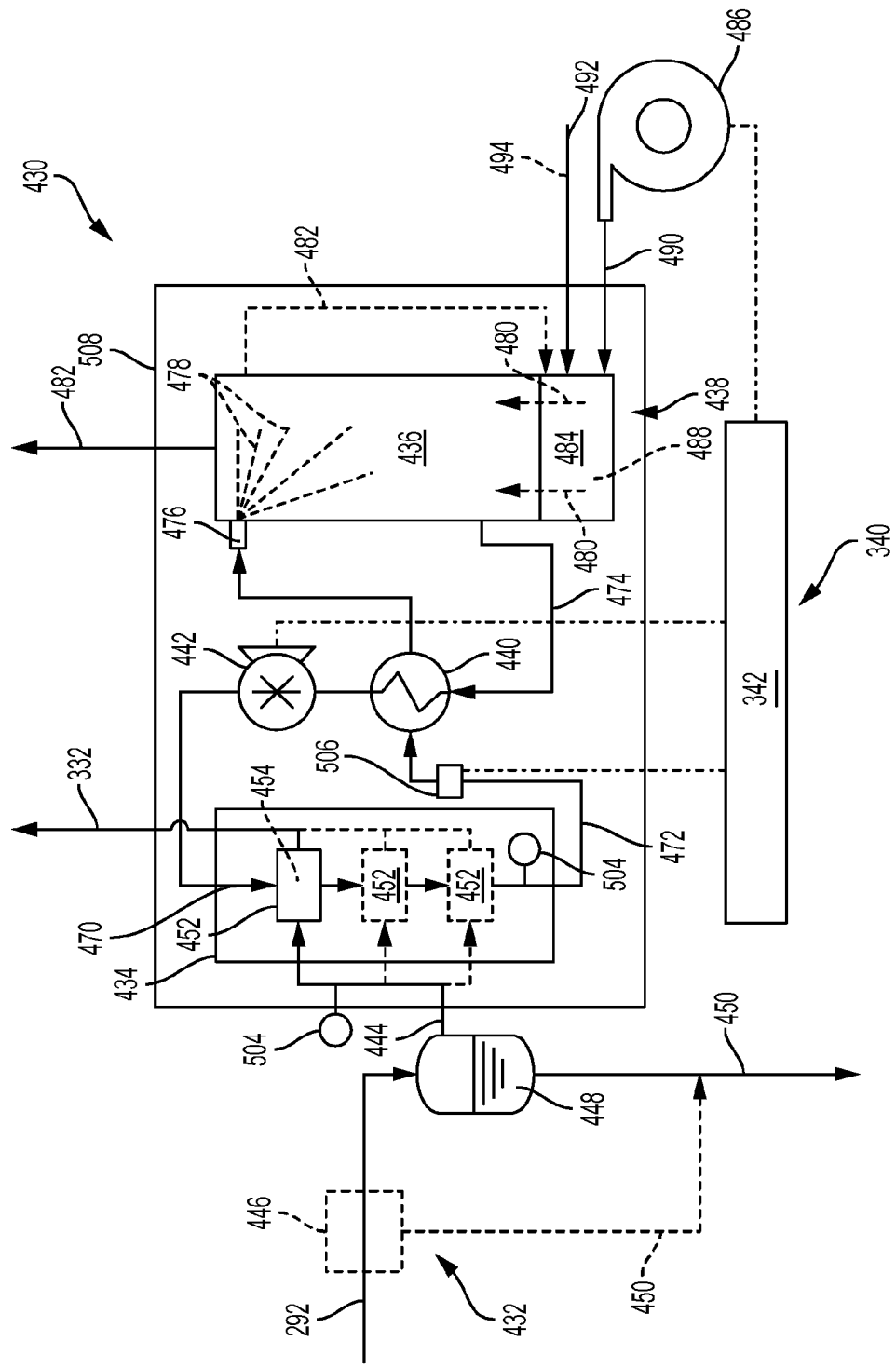
FIG. 19 is a schematic view of another example of a gas removal assembly of the refining assembly of FIG. 12.

Another example of second gas removal assembly 258 is shown in FIG. 19, which is generally indicated at 430. Unless specifically excluded, second gas removal assembly 430 may include one or more components of the other gas removal assemblies and/or other assemblies in this disclosure. Second gas removal assembly 430 may include a water removal assembly 432, a membrane contactor assembly 434, at least one stripper 436, at least one heating assembly 438, at least one heat exchanger 440, and at least one pump 442.

Water removal assembly 432 may include any suitable structure configured to remove water vapor and/or liquid water from one or more streams, such as intermediate stream 292, to form at least substantially dried stream 444. For example, water removal assembly 432 may include at least one water knockout device 446 and/or at least one gas dryer 448. Water removed by water removal assembly 432 may form at least one reclaimed water stream 450 that may be sent to feedstock delivery system 232 and/or other components of refining assembly 230.

Membrane contactor assembly 434 may include any suitable structure configured to separate carbon oxide gas and/or hydrogen gas from at least substantially dried stream 444 to form methane-rich stream 332. For example, membrane contactor assembly 434 may include one or more membrane contactors 452. Membrane contactor may include a plurality of carbon oxide selective membranes 454 that are configured to separate at least a portion of carbon oxide gas and/or hydrogen gas from stream(s) 444.

Figure 20:
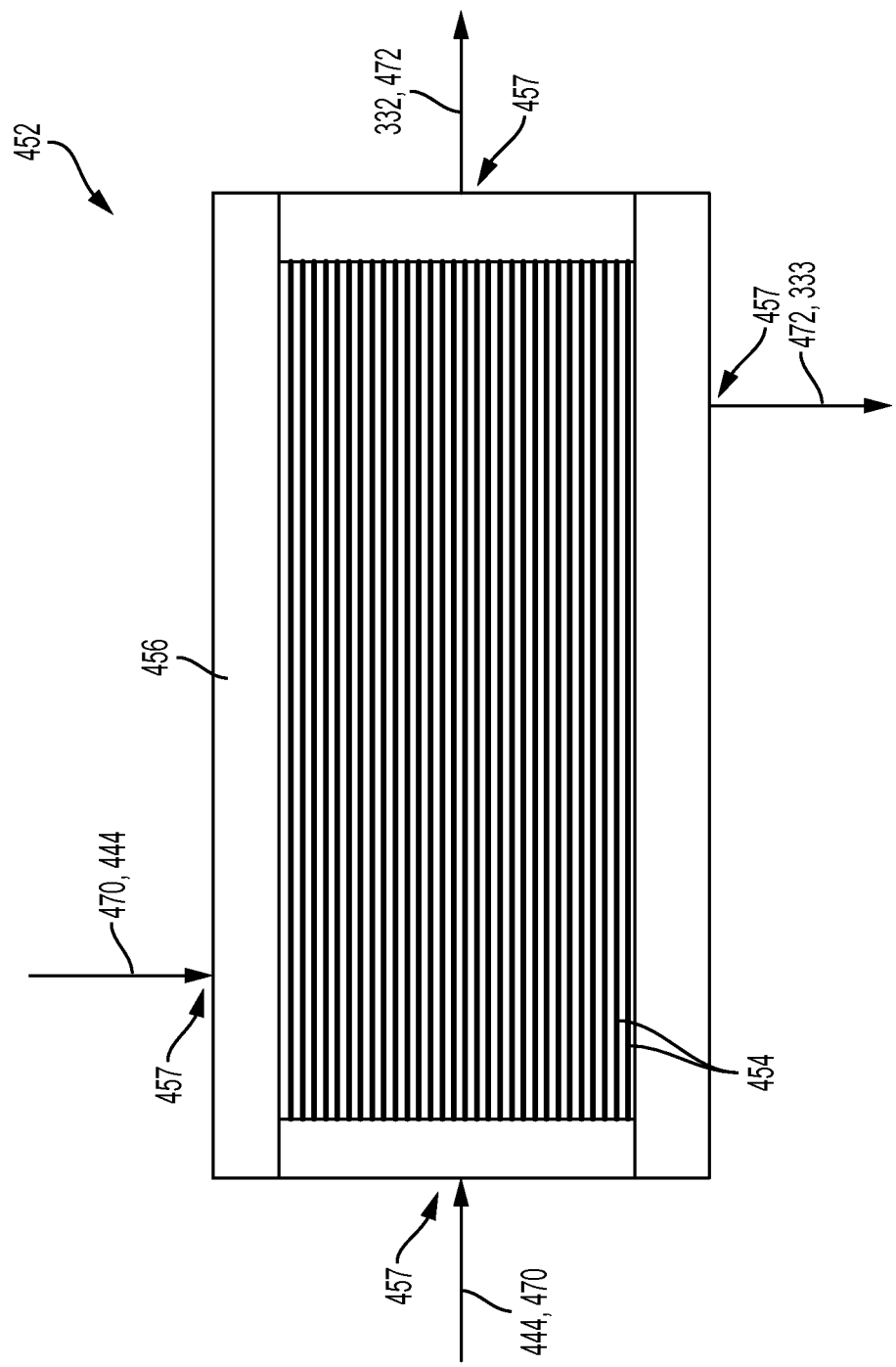
FIG. 20 is a schematic view of a membrane contactor of the gas removal assembly of FIG. 19.

Membranes 454 may be hollow fiber or small-diameter tubular membranes, which may be sealed (or potted) into a shell 456, as shown in FIG. 20. Shell 456 may include inlet and outlet ports 457 and any suitable number of membranes 454, such as hundreds to thousands of those membranes. Membranes 454 may have any suitable lengths, such as from about one centimeter to about two to three meters, and/or any suitable diameters, such as from 0.1 millimeters to 5 millimeters. The membranes may be configured to be microporous and/or highly permeable to carbon oxide gas and/or hydrogen gas.

Membranes 454 may be composed of material(s) that are chemically inert to the components of at least substantially dried stream(s) 444 (and/or output stream 292), whether those components are in gas phase and/or liquid phase. Additionally, when membranes 454 are microporous, the membranes may be composed of one or more materials that are not wet by the liquid phase of the components of streams 444 and/or 292, and/or liquid absorbent stream 470. In other words, the liquid phase of those components is not drawn into the micropore structure by capillary forces. Otherwise, if the micropore structure of the membranes is filled with the liquid phase, then relatively slow diffusion of carbon oxide gas out of the liquid-filled pores may adversely affect overall performance of the membranes. An example of a suitable microporous polypropylene membrane is made by Celgard®, LLC (Charlotte, N.C.).

Figure 21:
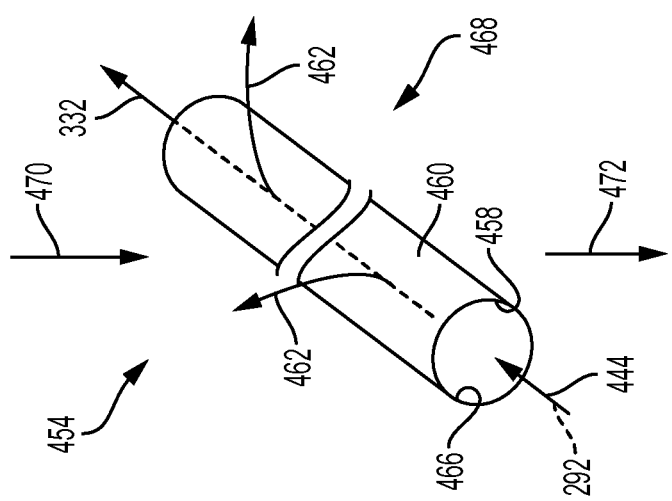
FIG. 21 is a schematic view of an example of a membrane of the membrane contactor of FIG. 20.

Membrane contactor(s) 452 may direct flow of at least substantially dried stream 444 (or intermediate stream 292, if that stream is not sent to water removal assembly 432) through a bore or lumen 458 of membranes 454, as shown in FIG. 21. At least a portion of carbon oxide gas and/or hydrogen gas may pass through one or more walls 460 into the membrane contactor shell, as indicated at 462 in FIG. 21. When streams 444 or 292 are directed to flow into and/or through lumen 458 of membranes 454, the interior of the lumens may be referred to as "feed side 466" and the interior of the shell (and/or exterior of the membranes) may be referred to as "permeate side 468."

Figure 22:
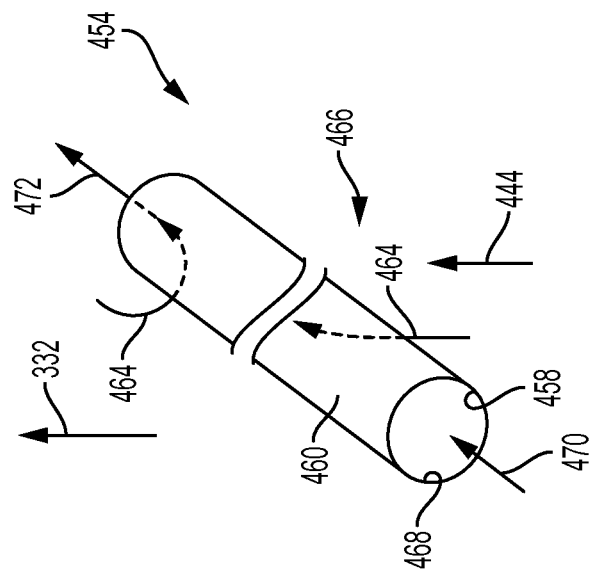
FIG. 22 is a schematic view of another example of a membrane of the membrane contactor of FIG. 20.

Alternatively, the membrane contactor(s) may direct flow of at least substantially dried stream 444 (or intermediate stream 292) through the membrane contactor shell and/or over the membranes, as shown in FIG. 22. At least a portion of carbon oxide gas and/or hydrogen gas may pass through wall(s) 460 into lumen 458 of membranes 454, as indicated at 464 in FIG. 22. When streams 444 or 292 are directed to flow into and/or through the membrane contactor shell and/or over the membranes, the interior of the membrane contactor shell or exterior of the membranes may be referred to as "feed side 466" and the interior of the lumens may be referred to as "permeate side 468." Preferably, streams 444 or 292 are directed to flow through the lumens of the membranes when the lumen diameter is small and the length of the membrane is long to prevent high pressure drops that would be encountered if liquid absorbent stream 470 is directed to flow through the lumens.

Additionally, membrane contactor(s) 452 may receive at least one liquid absorbent stream 470 at the permeate side of the membranes. The liquid absorbent stream may be adapted to absorb at least a portion of carbon oxide gas and/or hydrogen gas that passes from the feed side to the permeate side of membranes 454 to form liquid absorbent stream(s) 472 having absorbed carbon oxide gas and/or hydrogen gas (which also may be referred to as "spent liquid absorbent stream(s) 472"). For example, when membrane contactor(s) 452 are configured to receive at least substantially dried stream 444 (or intermediate stream 292) through lumens 458 of membranes 454, the membrane contactors may receive liquid absorbent stream 470 in membrane contactor shell 456. Alternatively, when membrane contactor(s) 452 are configured to receive streams 444 or 292 through membrane contactor shell 456, the membrane contactors may receive the liquid absorbent stream through lumens 458 of membranes 454. The liquid absorbent(s) in liquid absorbent stream(s) 470 may be configured to absorb (or bind) at least a portion of carbon oxide gas and/or hydrogen gas at relatively low temperatures and then release (or desorb) those gas(es) at elevated temperatures. Preferably, the liquid absorbent(s) in liquid absorbent stream(s) 470 are not driven by a pressure cycle.

Membrane contactor assembly 434 may include any suitable number of membrane contactors 452, as shown in dashed lines in FIG. 19. When membrane contactor assembly 434 includes two or more membrane contactors 452, those membrane contactors may be arranged in parallel or in series. Stripper 436 may include any suitable structure configured to receive one or more spent liquid absorbent streams 472, strip the absorbed carbon oxide gas and/or hydrogen gas from those stream(s), and/or deliver one or more stripped liquid absorbent streams 474 to membrane contactor(s) 452. For example, stripper 436 may include at least one spray nozzle 476 configured to at least partially atomize the spent liquid absorbent stream into one or more sprayed spent liquid absorbent streams 478. Stripper 436 may strip the absorbed carbon oxide gas and/or hydrogen gas via any suitable mechanism(s). For example, when the liquid absorbent(s) used for liquid absorbent stream 470 absorbs or binds carbon oxide gas and/or hydrogen gas within a first temperature range and releases or desorbs carbon oxide gas and/or hydrogen gas within a second temperature range higher than the first temperature range, then stripper 436 may be configured to receive one or more heated exhaust streams 480 from heating assembly 438 and direct the flow of those streams through the sprayed spent liquid absorbent stream(s).

The sprayed spent liquid stream(s) may be heated by the heated exhaust stream(s) between 60° C. and 200° C., and preferably between 80° C. and 150° C., to drive off the absorbed carbon oxide gas and/or hydrogen gas to produce or yield at least substantially regenerated liquid absorbent stream 474. The released or desorbed gasses may form at least one offgas stream 482. Stripper 436 may be operated within the range of 0 psig and 50 psig, and most preferably in the range of 0 psig and 10 psig.

Heating assembly 438 may include any suitable structure configured to produce at least one heated exhaust stream 480 for heating sprayed spent liquid absorbent stream(s) 478. For example, the heating assembly may heat the stripper to any suitable temperature(s), such as at least a minimum release or desorption temperature for the carbon oxide gas and/or hydrogen gas in the sprayed spent liquid absorbent stream(s).

The heating assembly may include a burner assembly 484, at least one air blower 486, and an igniter assembly 488, as shown in FIG. 19. The burner assembly may include any suitable structure configured to receive at least one air stream 490 and at least one fuel stream 492 and to combust the at least one fuel stream to produce heated exhaust stream(s) 480. The fuel stream(s) may be provided by feedstock delivery system 232 and/or one or more of the gas removal assemblies. For example, one or more gas removal assemblies that remove carbon oxide gas and/or hydrogen gas may send those gases to burner assembly 484 as a byproduct fuel stream 494. In some embodiments, at least a portion of offgas stream 482 may supplement fuel streams 492 and/or 494. Fuel streams 492, 494, and/or 482 may be delivered to burner assembly 378 via pump(s) and/or other suitable device(s). Air blower 486 may include any suitable structure configured to generate air stream(s) 492. Igniter assembly 488 may include any suitable structure configured to ignite fuel stream(s) 492, 494, and/or 482.

Figure 23:
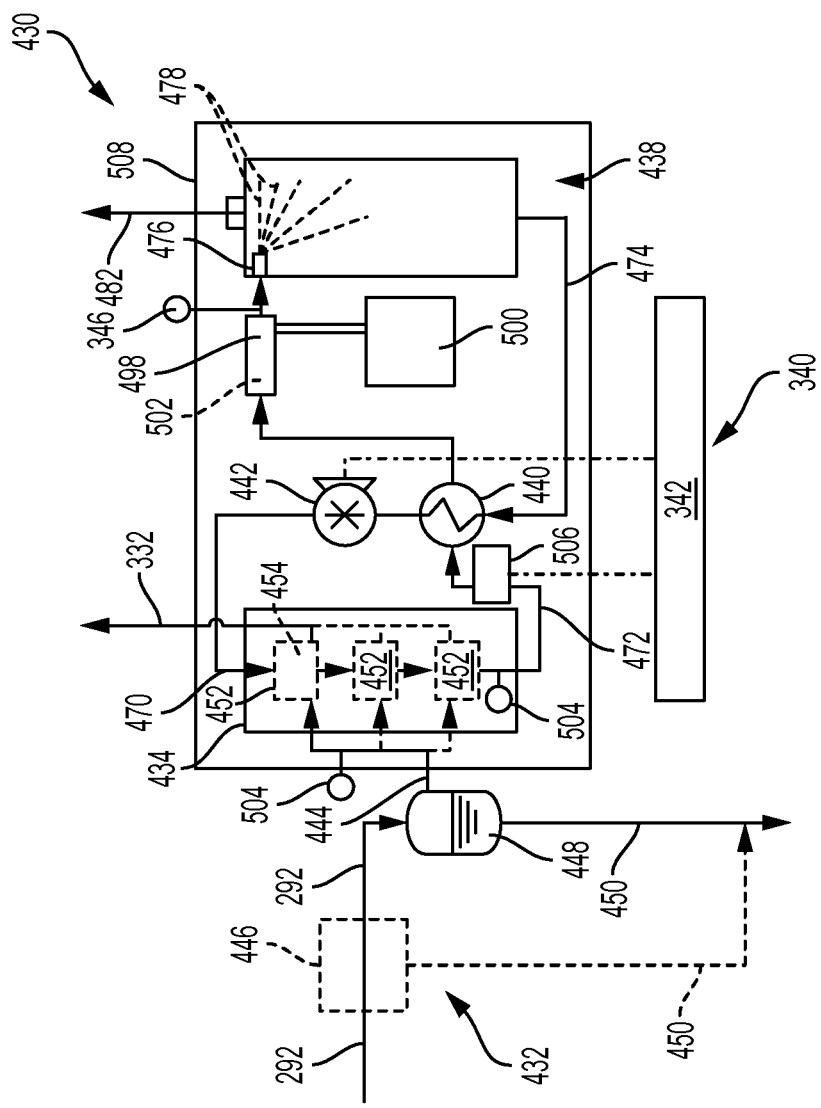
FIG. 23 is a schematic view of a further example of a gas removal assembly of the refining assembly of FIG. 12.

Additionally, other configuration and types of heating assemblies 438 may be used. For example, heating assembly 438 may include at least one heater 498 that is powered by at least one power assembly 500, as shown in FIG. 23. Heater 498 may include at least one heating element 502 (such as a resistive heating element). The heating element may heat spent liquid absorbent stream 472 prior to stripper 436 (and/or spray nozzle 476) and/or may heat the spent liquid absorbent stream in the stripper. Power assembly 500 may include one or more electric cords (to allow a user to plug the heater into an electrical outlet), solar panels, wind turbines, fuel cells, etc.

Heat exchanger 440 may include any suitable structure configured to transfer heat from the stripped liquid absorbent stream(s) to the spent liquid absorbent stream(s). Pump 442 may include suitable structure configured to deliver or transport stripped liquid absorbent stream(s) 474 to membrane contactor(s) 452 for additional absorption of carbon oxide gas and/or hydrogen gas from at least substantially dried stream 444 (or intermediate stream 292).

In some embodiments, control system 340 may further include pressure measurement devices 504 and at least one control valve 506, as shown in FIG. 19. Pressure measurement devices 504 may include pressure transducers or a differential pressure transducer that provides a feedback signal (typically 4-20 mA or voltage, such as 0-5 volts, 0-10 volts, or 0.5 to 4.5 volts) that is registered and processed by control assembly 342. Control valve 506 may include, for example, a proportional valve. Control assembly 342 may detect pressure in at least substantially dried stream 444 and spent liquid absorbent stream 472 via pressure measurement devices 504, and control the control valve based, at least in part, on the detected pressures. For example, control assembly 342 may be configured to ensure that the pressure of the spent liquid absorbent stream is higher than the pressure in the at least substantially dried stream to prevent the at least substantially dried stream from flowing from the feed side to the permeate side and bubble through the liquid absorbent stream.

Control assembly 342 may interpret the pressure measurements from the pressure measurement devices and signal control valve 506 to proportionally open if the pressure of the spent liquid absorbent stream is above the pressure of the at least substantially dried stream by more than a predetermined pressure (or pressure range), and to proportionally close if the pressure of the spent liquid absorbent stream is below the pressure of the at least substantially dried stream by less than a predetermined pressure (or pressure range). An example of a predetermined pressure range is 5 psig to 15 psig higher than the pressure of the at least substantially dried stream. However, other pressure ranges (and/or pressures) may be selected.

In some embodiments, gas removal assembly 430 may include a shell or housing 508 which may at least partially contain one or more other components of that assembly. For example, shell 508 may at least partially contain membrane contactor assembly 434, stripper 436, heating assembly 438, heat exchanger 440, and/or pump 442, as shown in FIGS. 19 and 23. In some embodiments, shell 508 may include insulation and/or a jacket.

Figure 24:
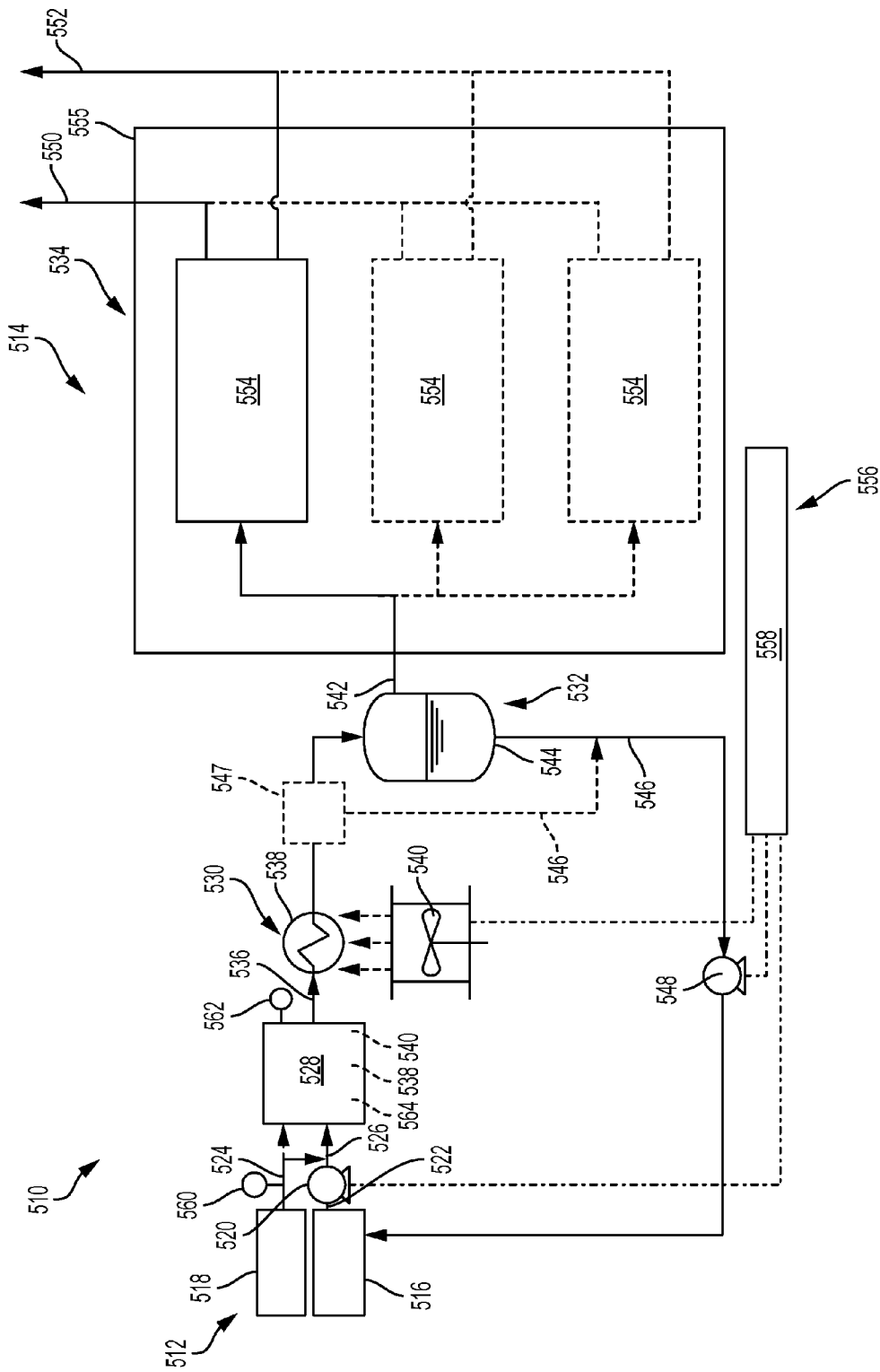
FIG. 24 is a schematic view of another example of a refining assembly for rich natural gas.

Another example of refining assembly 30 is shown in FIG. 24, which is generally indicated at 510. Unless specifically excluded, refining assembly 510 may include one or more components of the other refining assemblies and/or other assemblies in this disclosure. Refining assembly 510 may include a feedstock delivery system 512 and a fuel processing system 514.

Feedstock delivery system 512 may include any suitable structure configured to deliver one or more feed and/or fuel streams to one or more other components of refining assembly 510. For example, the feedstock delivery system may include a water source 516, a rich natural gas source 518, and a pump 520. The water source may be a storage tank, a storage container, a water reservoir, a natural body of water, etc. configured to provide a water stream 522 (such as a deionized water stream) to fuel processing system 514. Rich natural gas source 518 may be a wellhead, a storage tank, a storage container, etc. configured to provide a rich natural gas stream 524 to fuel processing system 514. Pump 520 may have any suitable structure configured to deliver or transport the water to fuel processing system 514. The rich natural gas stream may combine with the water stream to form at least one liquid-containing feed stream 526. Alternatively, or additionally, the rich natural gas stream may be delivered or transported to fuel processing system 514 and combine with the water stream at the fuel processing system. In some embodiments, feedstock delivery system 512 may include one or more additional pumps and/or compressors to deliver or transport rich natural gas stream 524 and/or water stream 522 and/or to fuel processing system 514.

Fuel processing system 514 may include any suitable structure configured to process rich natural gas stream(s) 524, such as to increase concentration of methane gas and/or reduce concentration of other components in the rich natural gas stream. For example, fuel processing system 514 may include at least one methane-producing assembly 528, a heat exchange assembly 530, a water removal assembly 532, and a membrane assembly 534.

Methane-producing assembly 528 may include any suitable structure configured to receive liquid-containing feed stream(s) 526 and produce an output stream 536 containing methane gas as the primary component but also containing water and other gases. For example, methane-producing assembly 528 may include at least one heavy hydrocarbon reforming (HHR) reactor 538 having a HHR catalyst 540.

Heat exchange assembly 530 may include one or more heat exchangers configured to transfer heat from one portion of the refining assembly to another portion. For example, heat exchange assembly 532 may include at least one heat exchanger 538 and one or more fans 540 configured to cool output stream 536. Although heat exchanger 538 is shown to cool output stream 536 via fan(s) 540, the heat exchanger may alternatively, or additionally, be cooled via one or more cooling fluid streams (such as one or more water streams).

Water removal assembly 532 may include any suitable structure configured to remove water from output stream 536 to produce an at least substantially dried stream 542. For example, water removal assembly 532 may include at least one gas dryer 544 configured to remove at least a substantial portion of water vapor from output stream 536 and to form at least one reclaimed water stream 546 from the removed water vapor. In some embodiments, the water removal assembly may include at least one water knockout device 547 configured to remove at least a substantial portion of liquid water from output stream 536. When refining assembly 514 includes one or more water knockout device(s), those devices may be immediately upstream of (or immediately prior to) the gas dryer(s) and the water extracted by those device(s) may form at least a portion of reclaimed water stream 546. In some embodiments, water removal assembly 532 may include a reclaimed water pump 548 configured to move or transport the reclaimed water stream to feedstock delivery system 512, such as to add or supplement water to water source 516. The reclaimed water stream(s) also may be sent to one or more other components of refining assembly 514 (such as to heat exchanger(s) 538, sent to drain, and/or otherwise disposed.

Membrane assembly 534 may include any suitable structure configured to separate at least a portion of carbon oxide gas and/or hydrogen gas from at least substantially dried stream 542 to form a methane-rich stream 550. The separated carbon oxide gas and/or hydrogen gas may form a byproduct stream 552, which may be sent to feedstock delivery system 512, one or more heating assemblies of methane-producing assembly 528, and/or other components of refining assembly 512. For example, membrane assembly 534 may include one or more carbon oxide selective membranes 554 that are configured to separate carbon oxide gas and/or hydrogen gas from stream(s) 542. Membrane assembly 534 may include any suitable number of membranes 554, as shown in dashed lines in FIG. 24. When membrane assembly 534 includes two or more membranes 554, those membranes may be arranged in parallel or in series. In some embodiments, membrane assembly 534 may include a shell or housing 555, which may include any suitable structure configured to at least partially contain membranes 554. In some embodiments, shell 555 may include insulation and/or a jacket.

Refining assembly 510 may, in some embodiments, include a control system 556, which may include any suitable structure configured to control operation of the refining assembly. For example, control system 556 may include a control assembly 558, one or more flow measurement devices 560, one or more temperature measurement devices 562, and one or more control valves 564, as shown in FIG. 24. Control assembly 558 may detect flow rate of rich natural gas stream 524 and adjust delivery (such as the flow rate) of water stream 522 based, at least in part, on the detected flow rate. Additionally, control assembly 558 may detect temperatures in the HHR reactor via temperature measurement devices 562 (such as thermocouples and/or other suitable devices) and adjust flow rate of the fuel stream(s) and/or byproduct fuel stream(s) to the heating assembly of that reactor via control valves 564 and/or adjust flow rate of the air stream(s) by controlling speed of the air blower(s) of that heating assembly, based, at least in part, on the detected temperature(s).

Figure 25:
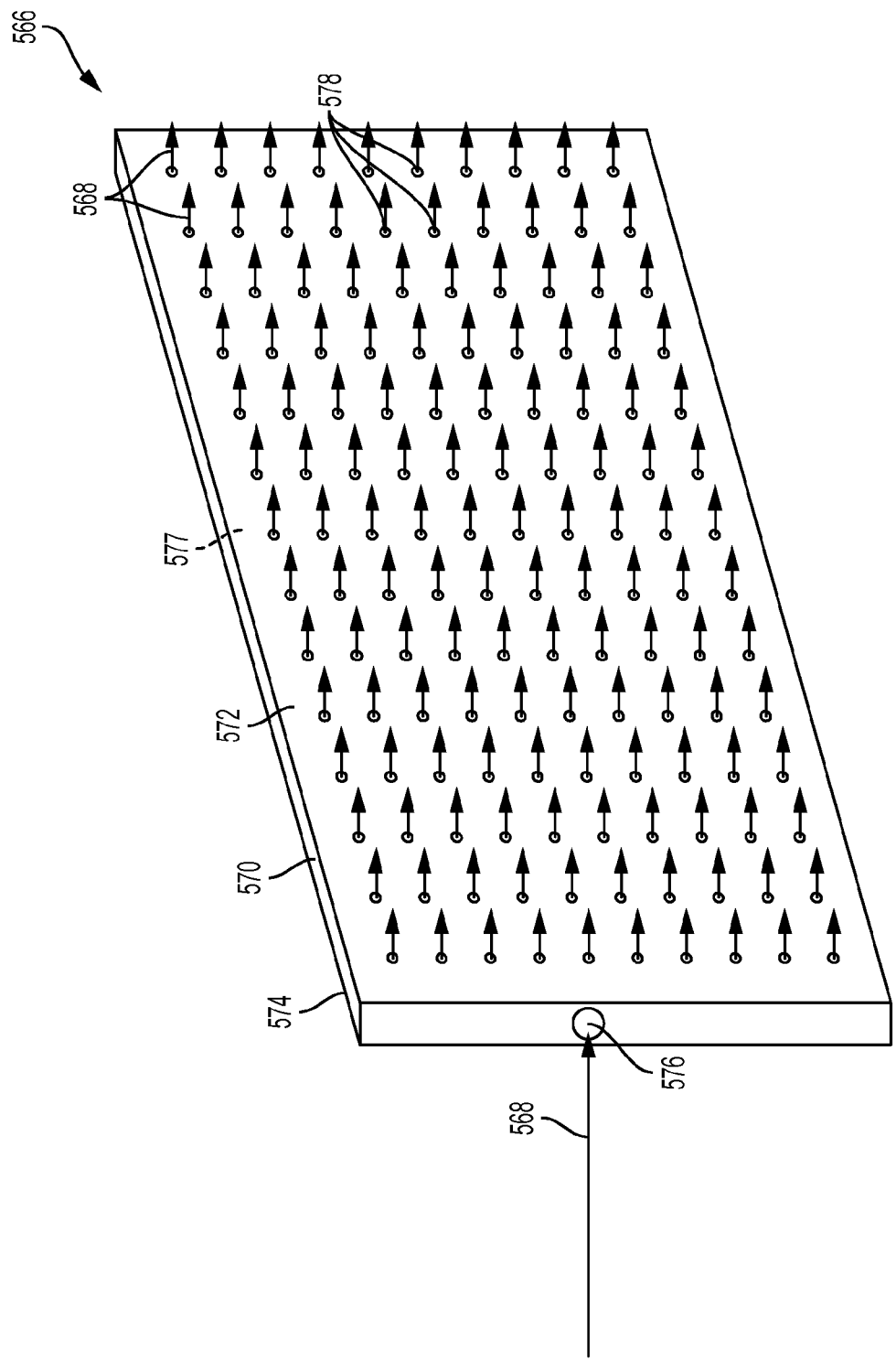
FIG. 25 is an example of a plate burner of a heating assembly for a refining assembly.

An example of a plate burner 566 is shown in FIG. 25, which may be used in one or more heating assemblies described in this disclosure. For example, plate burner 566 may be positioned adjacent to (or to the side of) a vaporizer. Plate burner 566 may include any suitable structure configured to receive at least one fuel stream 568 and to distribute that stream for combustion. For example, plate burner 566 may include a non-porous (or solid) frame 570 and first and second opposed plates 572, 574. Frame 570 may include at least one inlet or input port 576 configured to receive the at least one fuel stream. The frame and the first and second plates may define an interior 577. The inlet(s) may be fluidly connected to the interior. One or both of the first and second plates may be porous and/or may include a plurality of outlets 578, arranged orderly or randomly, for the at least one fuel stream. In use, one or more air blowers may be positioned adjacent to the first and/or second plates such that one or more air streams flow toward the fuels streams discharged from outlets 578 (such as flowing toward and about perpendicular to those fuel streams).

Figure 26:
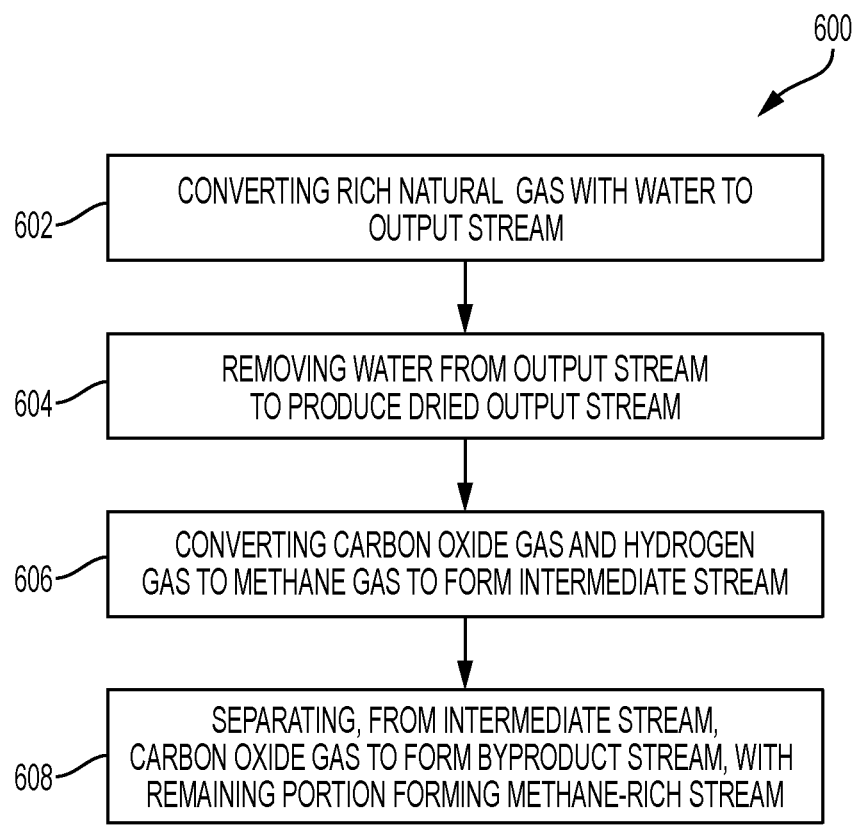
FIG. 26 is an example of a method of refining rich natural gas.

An example of a method of refining rich natural gas containing a first methane gas and other hydrocarbons that are heavier than methane gas is shown in FIG. 26 and is generally indicated at 600. Although particular steps are shown in FIG. 26, other examples of method 600 may omit, modify, duplicate, and/or add one or more steps. Additionally, the steps may be performed in any suitable sequence.

At step 602, at least a substantial portion of other hydrocarbons of the rich natural gas may be converted with water to an output stream containing a second methane gas, a lesser portion of the water, hydrogen gas, and/or carbon oxide gas (such as carbon dioxide gas and/or carbon monoxide gas). In some embodiments, converting at least a substantial portion of the other hydrocarbons may include not converting at least a substantial portion of the first methane gas from the rich natural gas. In other words, at least a substantial portion of the first methane gas may be allowed to pass through without conversion and/or reaction. In some embodiments, converting at least a substantial portion of the other hydrocarbons may include heating the rich natural gas and the water to a minimum methane-producing temperature in at least one heating assembly and/or feeding at least a portion of at least one byproduct stream to the heating assembly.

At step 604, at least a portion of the water from the output stream may be removed to produce an at least substantially dried stream. The water may be in the form of water vapor and/or liquid water.

At step 606, at least a portion of carbon oxide gas and at least a portion of hydrogen gas from the at least substantially dried stream may be converted to methane gas to form an intermediate stream therefrom containing a lower concentration of hydrogen gas and carbon oxide gas compared to the at least substantially dried stream. Step 606 may be performed once or may be repeated any suitable number of times, such as two, three, four, or more. In some embodiments, step 606 may be omitted.

At step 608, at least a portion of carbon oxide gas (and/or at least a portion of hydrogen gas) may be separated to form a byproduct stream therefrom. The remaining portion of the intermediate stream may form at least part of a methane-rich stream having a greater methane concentration than the intermediate stream. In some embodiments, at least a portion of the byproduct stream may be used as fuel for one or more heating steps of method 600. In some embodiments, separating at least a portion of the carbon oxide gas may include allowing at least a portion of the carbon oxide gas to pass from a feed side to a permeate side of at least one carbon oxide selective membrane. In some embodiments, separating at least a portion of the carbon oxide gas may include flowing at least one liquid absorbent stream through the permeate side of the at least one carbon oxide selective membrane to produce therefrom a liquid absorbent stream having absorbed carbon oxide gas (or spent liquid absorbent stream). In some embodiments, separating at least a portion of the carbon oxide gas may include detecting pressure of the intermediate stream, detecting pressure of the spent liquid absorbent stream, and/or controlling flow of the spent liquid absorbent stream such that the pressure of that liquid absorbent stream is greater than the pressure of the intermediate stream in the feed side of the at least one carbon oxide selective membrane. In some embodiments, separating at least a portion of the carbon oxide gas may include heating the spent liquid absorbent stream to strip at least a substantial portion of the absorbed carbon oxide gas to form a stripped liquid absorbent stream and an offgas stream containing the stripped carbon oxide gas.

Refining assemblies of the present disclosure may include one or more of the following:

A methane-producing assembly configured to receive at least one liquid-containing feed stream that includes water and rich natural gas.

A methane-producing assembly configured to receive rich natural gas and at least one liquid-containing feed stream that includes water.

A methane-producing assembly configured to produce an output stream by (a) converting at least a substantial portion of other hydrocarbons of a rich natural gas with water to a second methane gas, a lesser portion of the water, and other gases; and/or (b) allowing at least a substantial portion of a first methane gas from the rich natural gas to pass through the methane-producing assembly unconverted.

A vaporizer configured to receive and/or vaporize at least a portion of at least one liquid-containing feedstream that includes water with or without rich natural gas to form an at least substantially vaporized stream.

A methane-producing reactor containing a catalyst.

A methane-producing reactor configured to receive an at least substantially vaporized stream and/or a rich natural gas stream.

A methane-producing reactor configured to produce an output stream by (a) converting at least a substantial portion of other hydrocarbons with water to a second methane gas, a lesser portion of the water, and other gases; and (b) allowing at least a substantial portion of a first methane gas from rich natural gas to pass through the methane-producing reactor unconverted.

A heating assembly configured to produce a heated exhaust stream for heating at least one of a vaporizer to at least a minimum vaporization temperature and/or a methane-producing reactor to at least a minimum methane-producing temperature.

A heating assembly including a frame and first and second opposed plates attached to the frame and defining an interior therebetween.

A frame that includes one or more inlets that are fluidly connected to an interior and that are for receiving at least one fuel stream.

One or both of first and second plates include openings defining a plurality of outlets for at least one fuel stream.

A purification assembly configured to receive an output stream.

A purification assembly configured to produce a methane-rich stream having a greater methane concentration than the output stream.

At least one gas dryer configured to remove at least a substantial portion of water vapor from an output stream to produce an at least substantially dried stream.

At least one water knockout device configured to remove at least a substantial portion of liquid water from an output stream.

A purification assembly configured to convert at least a portion of carbon oxide gas and at least a portion of hydrogen gas in an at least substantially dried stream to methane gas, and to produce an intermediate stream therefrom.

At least one synthetic natural gas (SNG) reactor containing a catalyst.

At least one SNG reactor configured to convert at least a portion of carbon oxide gas and at least a portion of hydrogen gas in an at least substantially dried stream to methane gas, and to produce an intermediate stream therefrom.

A heating assembly configured to produce a heated exhaust stream for heating at least one SNG reactor to a minimum conversion temperature.

A purification assembly configured to separate at least a portion of carbon oxide gas from an intermediate stream, and to produce a byproduct stream therefrom.

At least one absorber configured to receive at least one absorbent that is adapted to absorb at least a portion of carbon oxide gas from an intermediate stream, and to produce a byproduct stream therefrom.

At least one absorber configured to receive a liquid absorbent stream that is adapted to absorb at least a portion of carbon oxide gas, and/or direct flow of an intermediate stream through the liquid absorbent stream.

At least one absorber configured to receive at least one solid absorbent that is adapted to absorb carbon oxide gas, and/or to direct flow of an intermediate stream through the at least one solid absorbent.

At least one stripper configured to (a) receive a liquid absorbent stream with absorbed carbon oxide gas, (b) strip the carbon oxide gas from that liquid absorbent stream to form an offgas stream therefrom, and/or (c) deliver the stripped liquid absorbent stream to at least one absorber.

At least one carbon oxide selective membrane having a feed side and a permeate side.

A feed side configured to receive an intermediate stream.

At least a portion of carbon oxide gas in an intermediate stream is configured to pass from a feed side to a permeate side.

A remaining portion of an intermediate stream that remains on a feed side forms at least part of a methane-rich stream.

A permeate side configured to receive a liquid absorbent stream that is adapted to absorb at least a portion of carbon oxide gas that passes from a feed side to a permeate side.

At least one stripper configured to (a) receive a liquid absorbent stream with absorbed carbon oxide gas, (b) strip the carbon oxide gas from that liquid absorbent stream to form a byproduct stream therefrom, and/or (c) deliver the stripped liquid absorbent stream to a permeate side of at least one carbon oxide selective membrane.

Methods of refining rich natural gas may include one or more of the following:

Receiving at least one liquid-containing feed stream that includes water and rich natural gas.

Receiving rich natural gas and at least one liquid-containing feed stream that includes water.

Vaporizing at least one liquid-containing feed stream that includes water with or without rich natural gas to form an at least substantially vaporized stream.

Receiving an at least substantially vaporized stream and/or a rich natural gas stream.

Converting at least a substantial portion of other hydrocarbons of rich natural gas with water to an output stream containing a second methane gas, a lesser portion of the water, hydrogen gas, and carbon oxide gas.

Not converting at least a substantial portion of first methane gas from rich natural gas.

Heating rich natural gas and water to a minimum methane-producing temperature via a heating assembly.

Feeding at least a portion of a byproduct stream to a heating assembly.

Removing at least a portion of water from an output stream to produce an at least substantially dried stream therefrom.

Converting at least a portion of carbon oxide gas and at least a portion of hydrogen gas from an at least substantially dried stream to methane gas to form an intermediate stream therefrom containing a lower concentration of hydrogen gas and carbon oxide gas to the at least substantially dried stream.

Separating, from an intermediate stream, at least a portion of carbon oxide gas to form a byproduct stream therefrom, wherein the remaining portion of the intermediate stream forms at least part of a methane-rich stream having a greater methane concentration than the intermediate stream.

Allowing at least a portion of carbon oxide gas to pass from a feed side to a permeate side of at least one carbon oxide selective membrane.

Flowing a liquid absorbent stream through a permeate side of at least one carbon oxide selective membrane to produce a liquid absorbent stream having absorbed carbon oxide gas.

Detecting pressure of an intermediate stream.

Detecting pressure of a liquid absorbent stream having absorbed carbon oxide gas.

Controlling flow of a liquid absorbent stream having absorbed carbon oxide gas such that the pressure of that liquid absorbent stream in a permeate side of at least one carbon oxide selective membrane is greater than a pressure of an intermediate stream in a feed side of at least one carbon oxide selective membrane.

Heating a liquid absorbent stream having absorbed carbon oxide gas to strip at least a substantial portion of absorbed carbon oxide gas to form a stripped liquid absorbent stream and an offgas stream containing stripped carbon oxide gas.

INDUSTRIAL APPLICABILITY

The present disclosure, including refining assemblies for rich natural gas, and components of those assemblies, is applicable to the fuel-processing and other industries in which methane gas is purified, produced, and/or utilized, such as for fueling an engine and/or electrical power generation.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A refining assembly for rich natural gas containing a first methane gas and other hydrocarbons that are heavier than methane gas, comprising:

a methane-producing assembly configured to receive at least one liquid-containing feed stream that includes water and rich natural gas and to produce an output stream therefrom by (a) converting at least a substantial portion of the other hydrocarbons of the rich natural gas with the water to a second methane gas, a lesser portion of the water, and other gases, and (b) allowing at least a substantial portion of the first methane gas from the rich natural gas to pass through the methane-producing assembly unconverted; and a purification assembly configured to receive the output stream and to produce a methane-rich stream therefrom having a greater methane concentration than the output stream, where the output stream includes water vapor, wherein the purification assembly includes at least one gas dryer configured to remove at least a substantial portion of the water vapor from the output stream to produce an at least substantially dried stream, and where the other gases in the output stream includes carbon oxide gas and hydrogen gas, wherein the purification assembly is configured to convert at least a portion of the carbon oxide gas and at least a portion of the hydrogen gas in the at least substantially dried stream to methane gas, and to produce an intermediate stream therefrom.

2. The refining assembly of claim 1, wherein the purification assembly includes:

at least one synthetic natural gas (SNG) reactor containing a catalyst and configured to convert at least a portion of the carbon oxide gas and at least a portion of the hydrogen gas in the at least substantially dried stream to methane gas, and to produce the intermediate stream therefrom; and a heating assembly configured to produce a heated exhaust stream for heating the at least one SNG reactor to a minimum conversion temperature.

3. The refining assembly of claim 2, wherein the heating assembly includes:

a frame; and first and second opposed plates attached to the frame and defining an interior therebetween, wherein the frame includes one or more inlets that are fluidly connected to the interior and that are for receiving at least one fuel stream, and one or both of the first and second plates include openings defining a plurality of outlets for the at least one fuel stream.

4. The refining assembly of claim 2, wherein the purification assembly is further configured to separate at least a portion of carbon oxide gas from the intermediate stream, and to produce a byproduct stream therefrom.

5. The refining assembly of claim 4, wherein the purification assembly includes at least one absorber configured to receive at least one absorbent that is adapted to absorb at least a portion of carbon oxide gas from the intermediate stream, and to produce the byproduct stream therefrom.

6. The refining assembly of claim 5, wherein the at least one absorber is configured to (a) receive a liquid absorbent stream that is adapted to absorb at least a portion of carbon oxide gas, and (b) direct flow of the intermediate stream through the liquid absorbent stream.

7. The refining assembly of claim 6, wherein the purification assembly further includes at least one stripper configured to (a) receive the liquid absorbent stream with absorbed carbon oxide gas, (b) strip the carbon oxide gas from that liquid absorbent stream to form an offgas stream therefrom, and (c) deliver the stripped liquid absorbent stream to the at least one absorber.

8. The refining assembly of claim 5, where the at least one absorber is configured to receive at least one solid absorbent that is adapted to absorb carbon oxide gas, and to direct flow of the intermediate stream through the at least one solid absorbent.

9. The refining assembly of claim 4, wherein the purification assembly includes at least one carbon oxide selective membrane having a feed side and a permeate side, the feed side is configured to receive the intermediate stream, at least a portion of the carbon oxide gas in the intermediate stream is configured to pass from the feed side to the permeate side, and the remaining portion of the intermediate stream that remains on the feed side forms at least part of the methane-rich stream.

10. The refining assembly of claim 9, wherein the permeate side is configured to receive a liquid absorbent stream that is adapted to absorb at least a portion of the carbon oxide gas that passes from the feed side to the permeate side.

11. The refining assembly of claim 10, wherein the purification assembly further includes at least one stripper configured to (a) receive the liquid absorbent stream with the absorbed carbon oxide gas, (b) strip the carbon oxide gas from that liquid absorbent stream to form a byproduct stream therefrom, and (c) deliver the stripped liquid absorbent stream to the permeate side of the at least one carbon oxide selective membrane.

12. The refining assembly of claim 11, wherein the methane-producing assembly includes:
a vaporizer configured to receive and vaporize at least a portion of the at least one liquid-containing feedstream that includes water and rich natural gas to form an at least substantially vaporized stream;
a methane-producing reactor containing a catalyst and configured to receive the vaporized feed stream and to produce the output stream by (a) converting at least a substantial portion of the other hydrocarbons with the water to the second methane gas, a lesser portion of the water, and the other gases and (b) allowing at least a substantial portion of the first methane gas from the rich natural gas stream to pass through the methane-producing reactor unconverted; and
a heating assembly configured to receive at least one fuel stream and at least one air stream to produce a heated exhaust stream for heating at least one of the vaporizer to at least a minimum vaporization temperature or the methane-producing reactor to at least a minimum methane-producing temperature, and wherein at least a portion of the byproduct stream forms at least part of the at least one fuel stream.

13. A refining assembly for rich natural gas containing a first methane gas and other hydrocarbons that are heavier than methane gas, comprising:
a methane-producing assembly configured to receive at least one liquid-containing feed stream that includes water and rich natural gas and to produce an output stream therefrom by (a) converting at least a substantial portion of the other hydrocarbons of the rich natural gas with the water to a second methane gas, a lesser portion of the water, and other gases, and (b) allowing at least a substantial portion of the first methane gas from the rich natural gas to pass through the methane-producing assembly unconverted; and
a purification assembly configured to receive the output stream and to produce a methane-rich stream therefrom having a greater methane concentration than the output stream,
where the output stream includes water vapor, wherein the purification assembly includes at least one gas dryer configured to remove at least a substantial portion of the water vapor from the output stream to produce an at least substantially dried stream,
where the other gases include carbon oxide gas and hydrogen gas, wherein the purification assembly is further configured to separate at least a portion of the carbon oxide gas and at least a portion of the hydrogen gas from the at least substantially dried stream, and to produce a byproduct stream therefrom, and
wherein the purification assembly includes at least one carbon oxide selective membrane having a feed side and a permeate side, the feed side is configured to receive the dried output stream, at least a portion of the carbon oxide gas and at least a portion of the hydrogen gas are configured to pass from the feed side to the permeate side to produce the byproduct stream therefrom, and the remaining portion of the output stream that remains on the feed side forms at least part of the methane-rich stream.

14. A method of refining rich natural gas containing a first methane gas and other hydrocarbons that are heavier than methane gas, comprising:
converting at least a substantial portion of the other hydrocarbons of the rich natural gas with water to an output stream containing a second methane gas, a lesser portion of the water, hydrogen gas, and carbon oxide gas, wherein converting at least a substantial portion of the other hydrocarbons includes not converting at least a substantial portion of the first methane gas from the rich natural gas;
removing at least a portion of the water from the output stream to produce an at least substantially dried stream therefrom;
converting at least a portion of the carbon oxide gas and at least a portion of the hydrogen gas from the at least substantially dried stream to methane gas to form an intermediate stream therefrom containing a lower concentration of hydrogen gas and carbon oxide gas compared to the at least substantially dried stream; and
separating, from the intermediate stream, at least a portion of the carbon oxide gas to form a byproduct stream therefrom, wherein the remaining portion of the intermediate stream forms at least part of a methane-rich stream having a greater methane concentration than the intermediate stream.

15. The method of claim 14, wherein separating at least a portion of the carbon oxide gas includes allowing at least a portion of the carbon oxide gas to pass from a feed side to a permeate side of at least one carbon oxide selective membrane.

16. The method of claim 15, wherein separating at least a portion of the carbon oxide gas further includes flowing a liquid absorbent stream through the permeate side of the at least one carbon oxide selective membrane to produce therefrom a liquid absorbent stream having absorbed carbon oxide gas.

17. The method of claim 16, wherein separating at least a portion of the carbon oxide gas further includes:
  detecting pressure of the intermediate stream;
  detecting pressure of the liquid absorbent stream having absorbed carbon oxide gas; and
  controlling flow of the liquid absorbent stream having absorbed carbon oxide gas such that the pressure of that liquid absorbent stream in the permeate side of the at least one carbon oxide selective membrane is greater than the pressure of the intermediate stream in the feed side of the at least one carbon oxide selective membrane.

18. The method of claim 16, wherein separating at least a portion of the carbon oxide gas further includes heating the liquid absorbent stream having absorbed carbon oxide gas to strip at least a substantial portion of the absorbed carbon oxide gas to form a stripped liquid absorbent stream and an offgas stream containing the stripped carbon oxide gas.

19. The method of claim 14, wherein converting at least a substantial portion of the other hydrocarbons with water includes heating the rich natural gas and the water to a minimum methane-producing temperature via a heating assembly.

20. The method of claim 19, wherein converting at least a substantial portion of the other hydrocarbons includes feeding at least a portion of the byproduct stream to the heating assembly.

21. A refining assembly for rich natural gas containing a first methane gas and other hydrocarbons that are heavier than methane gas, comprising:
  a vaporizer configured to receive and vaporize at least a portion of at least one liquid-containing feedstream that includes water and rich natural gas to form an at least substantially vaporized stream;
  a methane-producing reactor containing a catalyst and configured to receive the vaporized feed stream and to produce an output stream by (a) converting at least a substantial portion of the other hydrocarbons with the water to a second methane gas, a lesser portion of the water, hydrogen gas, and carbon oxide gas, and (b) allowing at least a substantial portion of the first methane gas from the rich natural gas stream to pass through the methane-producing reactor unconverted;
  a first heating assembly configured to receive at least one fuel stream and at least one air stream and produce a heated exhaust stream for heating at least one of the vaporizer to at least a minimum vaporization temperature or the methane-producing reactor to at least a minimum methane-producing temperature;
  a purification assembly configured to receive the output stream and to produce a methane-rich stream therefrom having a greater methane concentration than the output stream, wherein the purification assembly includes at least one of a gas dryer or a water knockout device configured to remove at least a substantial portion of water from the output stream to produce an at least substantially dried stream; and
  at least one synthetic natural gas (SNG) reactor containing a catalyst and configured to convert at least a portion of the carbon oxide gas and at least a portion of the hydrogen gas in the at least substantially dried stream to methane gas, and to produce an intermediate stream therefrom; and
  a second heating assembly configured to produce a heated exhaust stream for heating the at least one SNG reactor to a minimum conversion temperature.

22. The refining assembly of claim 21, wherein the purification assembly further includes at least one absorber having at least one absorbent configured to absorb at least a portion of carbon oxide gas from the intermediate stream, and to produce a byproduct stream therefrom.

23. The refining assembly of claim 21, wherein at least a portion of the byproduct stream forms at least part of the at least one fuel stream for the first heating assembly.

24. The refining assembly of claim 21, wherein the purification assembly further includes at least one carbon oxide selective membrane having a feed side and a permeate side, the feed side is configured to receive the intermediate stream, at least a portion of the carbon oxide gas in the intermediate stream is configured to pass from the feed side to the permeate side, and the remaining portion of the intermediate stream that remains on the feed side forms at least part of the methane-rich stream.

25. The refining assembly of claim 24, wherein the permeate side is configured to receive a liquid absorbent stream adapted to absorb at least a portion of the carbon oxide gas that passes from the feed side to the permeate side.

26. A refining assembly for rich natural gas containing a first methane gas and other hydrocarbons that are heavier than methane gas, comprising:
  a vaporizer configured to receive and vaporize at least a portion of at least one liquid-containing feedstream that includes water and rich natural gas to form an at least substantially vaporized stream;
  a methane-producing reactor containing a catalyst and configured to receive the vaporized feed stream and to produce an output stream by (a) converting at least a substantial portion of the other hydrocarbons with the water to a second methane gas, a lesser portion of the water, hydrogen gas, and carbon oxide gas, and (b) allowing at least a substantial portion of the first methane gas from the rich natural gas stream to pass through the methane-producing reactor unconverted;
  a first heating assembly configured to receive at least one fuel stream and at least one air stream and produce a heated exhaust stream for heating at least one of the vaporizer to at least a minimum vaporization temperature or the methane-producing reactor to at least a minimum methane-producing temperature; and
  a purification assembly configured to receive the output stream and to produce a methane-rich stream therefrom having a greater methane concentration than the output stream,
  wherein the purification assembly includes at least one of a gas dryer or a water knockout device configured to remove at least a substantial portion of water from the output stream to produce an at least substantially dried stream, and
  wherein the purification assembly includes at least one carbon oxide selective membrane having a feed side and a permeate side, the feed side is configured to receive the at least substantially dried stream, at least a portion of the carbon oxide gas and at least a portion of the hydrogen gas in the dried output stream are configured to pass from the feed side to the permeate side to produce a byproduct stream therefrom, and the remaining portion of the dried output stream that remains on the feed side forms at least part of the methane-rich stream.

27. The refining assembly of claim 26, wherein at least a portion of the byproduct stream forms at least part of the at least one fuel stream for the first heating assembly.

* * * * *

UNITED STATES PATENT AND TRADEMARK OFFICE
CERTIFICATE OF CORRECTION

PATENT NO. : 9,605,224 B2
APPLICATION NO. : 14/734763
DATED : March 28, 2017
INVENTOR(S) : Edlund et al.

Page 1 of 1

It is certified that error appears in the above-identified patent and that said Letters Patent is hereby corrected as shown below:

On the Title Page

Item (12) "Edlund" should read -- Edlund, et al. --.

Item (72) Inventor is corrected to read:
-- David J Edlund, Bend (OR);
Ryan K. Kemmet, Phoenix (AZ) --.

Signed and Sealed this
Twenty-eighth Day of July, 2020

Andrei Iancu
*Director of the United States Patent and Trademark Office*